(12) United States Patent
Li et al.

(10) Patent No.: US 11,350,108 B2
(45) Date of Patent: May 31, 2022

(54) AFFINE INTER PREDICTION REFINEMENT WITH OPTICAL FLOW

(71) Applicant: TENCENT AMERICA LLC, Palo Alto, CA (US)

(72) Inventors: Guichun Li, Milpitas, CA (US); Xiang Li, Saratoga, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/822,075

(22) Filed: Mar. 18, 2020

(65) Prior Publication Data

US 2020/0304805 A1 Sep. 24, 2020

Related U.S. Application Data

(60) Provisional application No. 62/820,196, filed on Mar. 18, 2019, provisional application No. 62/828,425, filed on Apr. 2, 2019, provisional application No. 62/838,798, filed on Apr. 25, 2019.

(51) Int. Cl.
| | |
|---|---|
| H04N 19/159 | (2014.01) |
| H04N 19/176 | (2014.01) |
| H04N 19/52 | (2014.01) |
| H04N 19/172 | (2014.01) |
| H04N 19/117 | (2014.01) |
| H04N 19/174 | (2014.01) |

(52) U.S. Cl.
CPC ......... *H04N 19/159* (2014.11); *H04N 19/117* (2014.11); *H04N 19/172* (2014.11); *H04N 19/174* (2014.11); *H04N 19/176* (2014.11); *H04N 19/52* (2014.11)

(58) Field of Classification Search
None
See application file for complete search history.

(56) References Cited

U.S. PATENT DOCUMENTS

| | | | |
|---|---|---|---|
| 10,631,002 B2 * | 4/2020 | Li | ............... H04N 19/52 |
| 2018/0199057 A1 * | 7/2018 | Chuang | ............... H04N 19/533 |
| 2018/0262773 A1 | 9/2018 | Chuang et al. | |

(Continued)

FOREIGN PATENT DOCUMENTS

| | | | | |
|---|---|---|---|---|
| WO | WO-2012035476 A1 * | 3/2012 | ........... H04N 19/154 |
| WO | WO 2017/171107 A1 | 10/2017 | |

(Continued)

OTHER PUBLICATIONS

International Search Report and Written Opinion dated Aug. 4, 2020 in International Application No. PCT/US 20/23336, citing documents AA, AO-AP therein, 13 pgs.

(Continued)

*Primary Examiner* — Stefan Gadomski
(74) *Attorney, Agent, or Firm* — Arentfox Schiff LLP

(57) ABSTRACT

An apparatus for video decoding includes processing circuitry. The circuitry can be configured to receive a syntax element indicating whether a prediction refinement with optical flow (PROF) is disabled for affine prediction. Further, the circuitry can determine whether to apply the PROF to an affine coded block based on the syntax element. Responsive to the syntax element indicating not to apply the PROF to the affine coded block, the circuitry can disable the PROF to the affine coded block.

19 Claims, 26 Drawing Sheets

(56) References Cited

U.S. PATENT DOCUMENTS

| | | | |
|---|---|---|---|
| 2018/0270500 A1* | 9/2018 | Li | H04N 19/176 |
| 2019/0028731 A1* | 1/2019 | Chuang | H04N 19/105 |
| 2019/0045215 A1* | 2/2019 | Chen | H04N 19/577 |
| 2019/0124332 A1* | 4/2019 | Lim | H04N 19/137 |
| 2019/0141333 A1* | 5/2019 | Lee | H04N 19/577 |
| 2019/0158843 A1* | 5/2019 | Xu | H04N 19/573 |
| 2020/0221122 A1* | 7/2020 | Ye | H04N 19/103 |
| 2020/0288150 A1* | 9/2020 | Jun | H04N 19/119 |
| 2021/0051342 A1* | 2/2021 | Galpin | H04N 19/186 |
| 2021/0136395 A1* | 5/2021 | Jun | H04N 19/119 |
| 2021/0136400 A1* | 5/2021 | Chen | H04N 19/513 |

FOREIGN PATENT DOCUMENTS

| | | | | |
|---|---|---|---|---|
| WO | WO-2017188566 A1 * | 11/2017 | | H04N 19/159 |
| WO | WO-2018048265 A1 * | 3/2018 | | H04N 19/176 |
| WO | WO-2018084339 A1 * | 5/2018 | | H04N 19/109 |
| WO | WO-2018124329 A1 * | 7/2018 | | H04N 19/159 |
| WO | WO 2018/171796 A1 | 9/2018 | | |

OTHER PUBLICATIONS

Bross et al., "Versatile Video Coding (Draft 4)," JVET-M1001, 13th Meeting: Marrakech, MA, Jan. 9-18, 2019 (299 pages).

Luo et al., "CE2-related: Prediction refinement with optical flow for affine mode." JVET-N0236. 14th Meeting: Geneva, CH, Mar. 19-27, 2019 (7 pages).

High Efficiency Video Coding (HEVC), Rec. ITU-T H.265, International Telecommunication Union, Dec. 2016. (664 pages).

Jiancong (Daniel) Luo, CE2-relaed: Prediction refinement with opticaal flow for affine mode, Joint Video Experts Team (JVET), of ITU-SG 16 WP 3 and ISO/IEC JTC 1/SC 29/WG 11. 14th Meeting; Geneva, CH, Mar. 19-27, 2019, Document: JVET-N0236-r1, 7 pgs).

Jianie Chen, et al., Algorithm Description of Joint Exploration Test Model 7 (JEM 7), Joint Video Exploration Team (JVET), of ITU-T SG 16 WP 3 and ISO/IEC JTC 1/SC 29/WG 11, 7th Meeting: Torino, IT, Jul. 13-21, 2017, Document: JVET-G1001-V1, 50 pgs.

Vadim Seregin, et al., CE10-related: Unidirectional illumination compensation, Joint Video Experts Team (JVET), of ITU-T SG 16 WP 3 and ISO/IEC JTC 1/SC 29/WG 11, 13th Meeting: Marrakech, MA, Jan. 9-18, 2019, Document: JVET-M0500-v3, 4 pgs.

Benjamin Bross, Versatile Video Coding (Draft 3), Joint Video Experts Team (JVET), of ITU-T SG 16 WP 3 and ISO/IEC JTC 1/SC 29/WG 11, 12th Meeting: Macao, CN, Oct. 3-12, 2018, Document: JVET-L1001-v7, 230 pgs.

Huanbang Chen, et al. CE1-related: Combination of LIC and affine, Joint Video Experts Team (JVET), of ITU-T SG WP 3 and ISO/IEC JTC 1/SC 29/WG 11, 14th Meeting: Geneva, CH, Mar. 19-27, 2019, Document: JVET-N0171-v2, 10 pgs.

* cited by examiner

FIG. 26

AFFINE INTER PREDICTION REFINEMENT WITH OPTICAL FLOW

INCORPORATION BY REFERENCE

This present application claims the benefit of priority to U.S. Provisional Application No. 62/820,196, "Affine Inter Prediction Refinement Methods" filed on Mar. 18, 2019, No. 62/828,425, "LIC Signaling and Affine Refinement" filed on Apr. 2, 2019, No. 62/838,798, "Inter Prediction Refinement Methods" filed on Apr. 25, 2019, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p604:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The circuitry can be configured to determine whether to apply the PROF to an affine coded block, and responsive to a determination to apply the PROF to the affine coded block, perform a PROF process.

For example, during the PROF process, a prediction sample I(ij) at a sample location (ij) in the affine coded block can be generated. Spatial gradients g_x (i,j) and g_y (ij) at the sample location (ij) in the affine coded block can be generate. A prediction refinement ΔI(ij) based on the spatial gradients g_x (ij) and g_y (ij) can be generated. The prediction refinement ΔI(ij) can added to the prediction sample I(ij) to generate a refined prediction sample.

In an example, a syntax element indicating whether the PROF is enabled for affine prediction is received at the decoder. In an example, the PROF is enabled for affine prediction by default.

In an example, the syntax element is signaled at a sequence level, a slice level, a tile level, a tile group level, or a picture level. In an example, whether to apply the PROF to the affine coded block can be determined based on values of affine parameters of an affine model of the affine coded block. In an example, the spatial gradients g_x (ij) and g_y (ij) at the sample location (ij) are generated based on a first prediction sample(s) of a first sub-block including the prediction sample I(ij) and a second prediction sample(s) of a second sub-block neighboring the first sub-block. The first sub-block and the second sub-block can be partitioned from the affine coded block. In an example, inter prediction for sub-blocks of the affine coded block is performed, and spatial gradients at sample locations are generated on a basis of prediction samples of the entire affine coded block.

In an example, the spatial gradients g_x (ij) and g_y (i,j) at the sample location (ij) are generated using a generated gradient filter on reference samples in a reference picture of the affine coded block. For example, the generated gradient filter can be generated by a convolution of a first gradient filter and an interpolation filter. Applying the interpolation filter on the reference samples in the reference picture of the affine coded block generates prediction samples of the affine coded block, and subsequently applying the first gradient filter on the generated prediction samples of the affine coded block generates the spatial gradients g_x (ij) and g_y (ij).

In an example, whether to apply the PROF to the affine coded block is determined based on the received syntax element indicating whether the PROF for affine prediction is enabled, and a signaling indicating whether a local illumination compensation (LIC) is enabled. In an example, the affine coded block is coded in an affine merge mode, and an LIC flag value of the affine coded block is inherited from a neighboring block of the affine coded block that is used as a source for affine model inheritance or affine model construction of the affine coded block.

In some examples, another apparatus for video decoding can include processing circuitry configured to determine an intermediate motion vector MVblock of a current block having a high precision compared with a low precision supported by an interpolation filter of the current block, round the intermediate motion vector MVblock to generate a rounded motion vector MVround of the current block having the low precision supported by the interpolation filter of the current block, and generate a prediction block of the current block based on the rounded motion vector MVround and the interpolation filter. A prediction refinement offset ΔI(ij) can be determined according to:

$$\Delta I(i,j) = g\_x(i,j) * \Delta v\_x + g\_y(i,j) * \Delta v\_y,$$

where g_x (ij) and g_y (ij) are gradients of a prediction sample of the prediction block at a location (ij) along x and y directions, respectively, and Δv_x and Δv_y are motion vector differences between the intermediate motion vector MVblock and the rounded motion vector MVround along x and y directions, respectively. The prediction refinement offset ΔI(ij) can be added to the prediction sample of the predication block to generate a refined prediction sample.

In an example, the current block is a block or a sub-block coded with a temporal motion vector prediction mode (TMVP), a sub-block-based TMVP mode (SbTMVP), merge with motion vector difference (MMVD), affine advance motion vector prediction (AMVP), or a spatial motion vector prediction mode where the intermediate motion vector MVblock is generated in a motion vector scaling operation, or the current block is coded using a motion vector predictor with the high precision.

In an example, a syntax element can be received indicating the high precision in a sequence parameter set (SPS), picture parameter set (PPS), a slice header, a tile group header. In an example, the intermediate motion vector MVblock having a high precision can be stored in a memory. Another block in a current picture including the current block can be coded using the intermediate motion vector MVblock for spatial motion vector prediction.

Aspects of the disclosure also provide non-transitory computer-readable media storing instructions which when executed by a computer for video decoding cause the computer to perform the methods for video decoding.

BRIEF DESCRIPTION OF THE DRAWINGS

Further features, the nature, and various advantages of the disclosed subject matter will be more apparent from the following detailed description and the accompanying drawings in which:

FIG. 26 shows examples of kernels of the Sobel, Scharr, Prewitt and Roberts filters.

DETAILED DESCRIPTION OF EMBODIMENTS

I. Video Coding Encoder and Decoder

Figure 2:
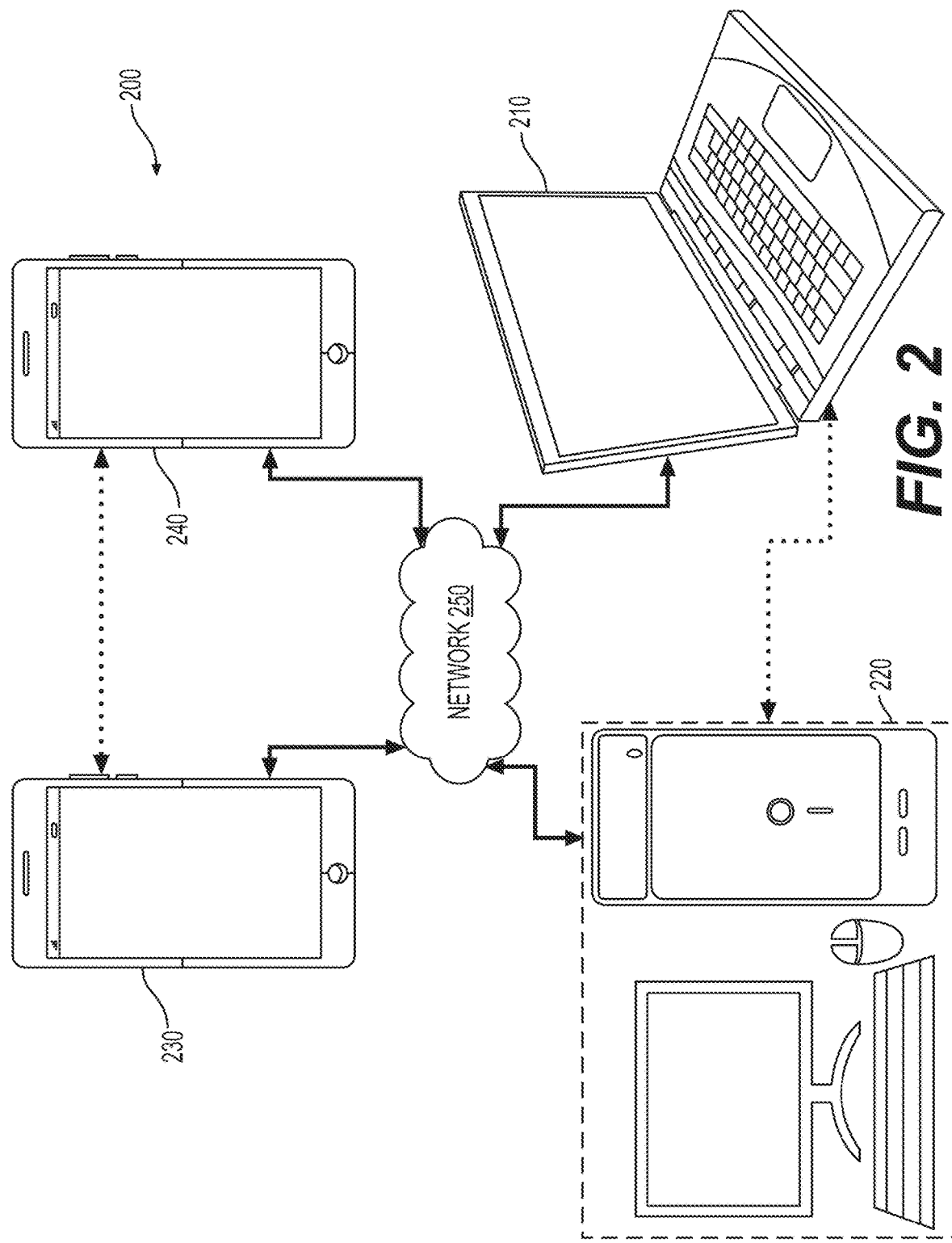
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
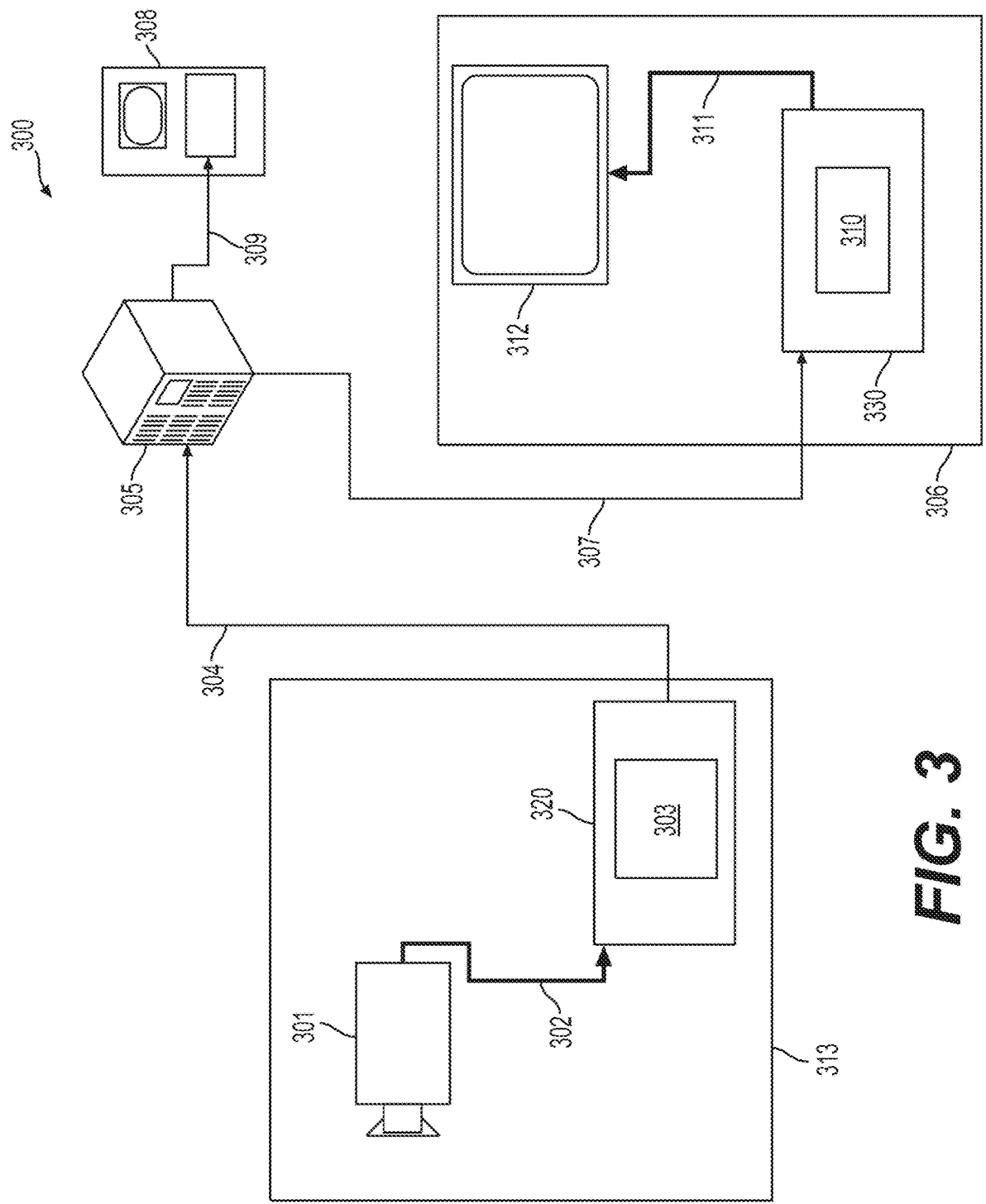
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
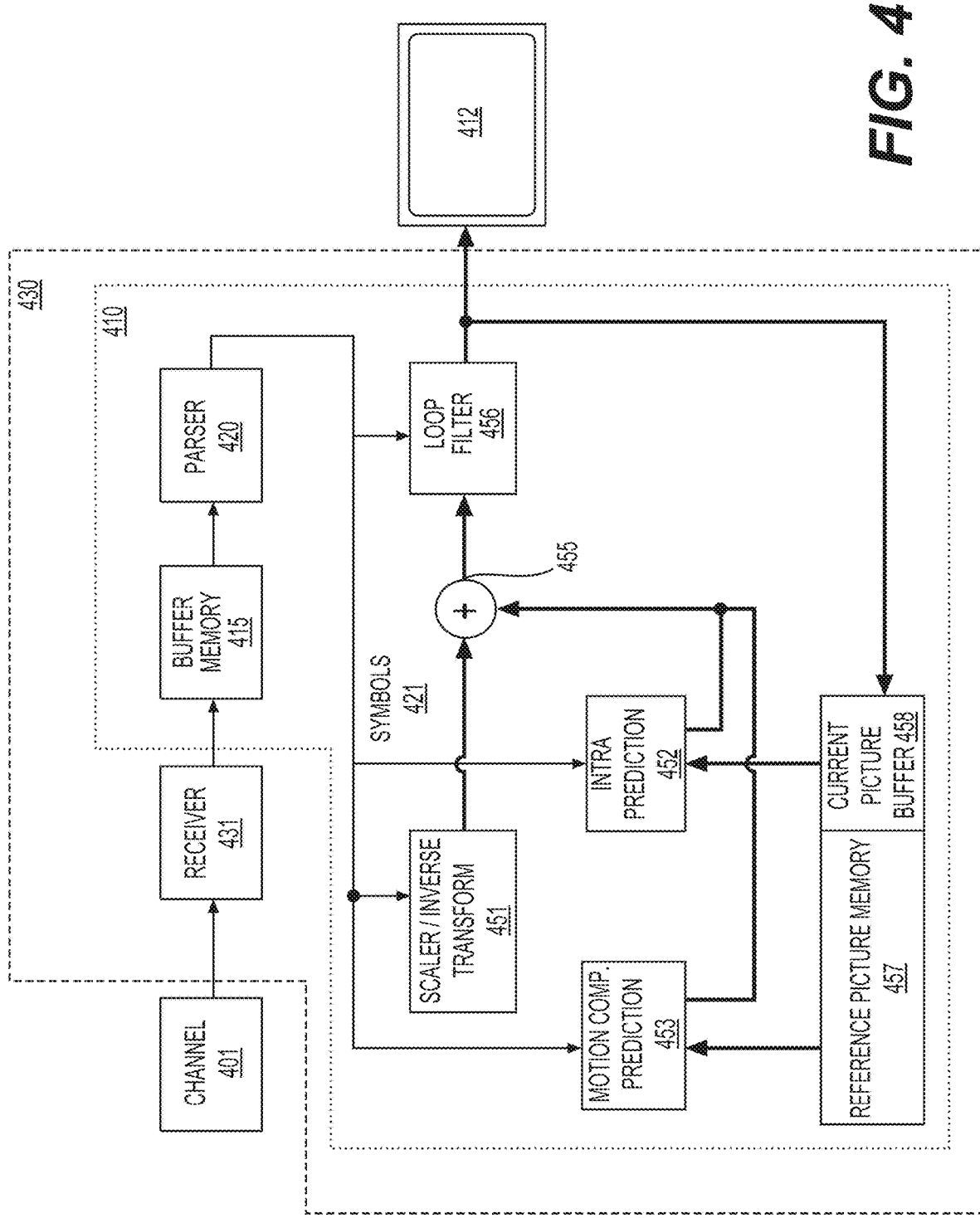
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
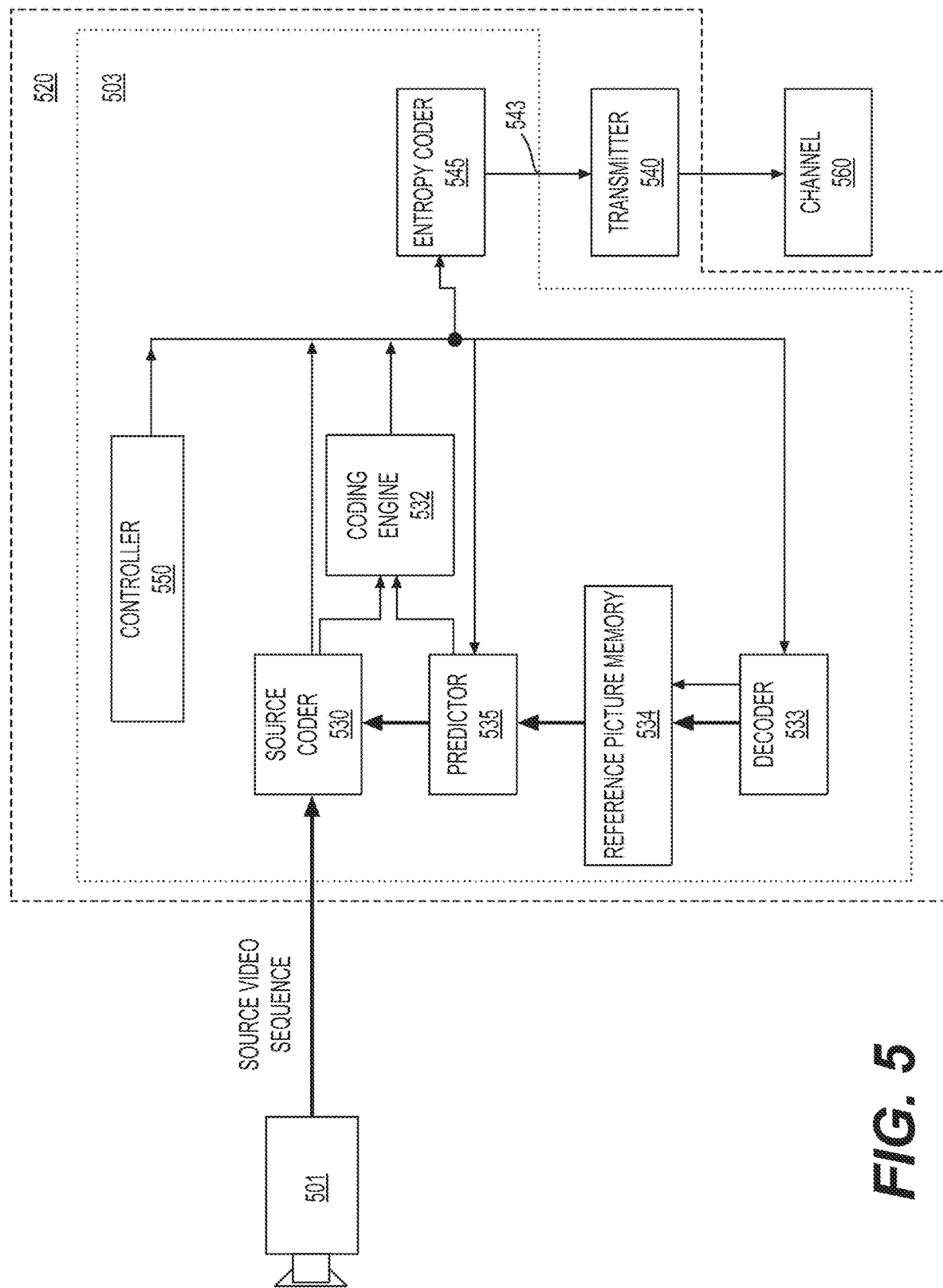
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any color space (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
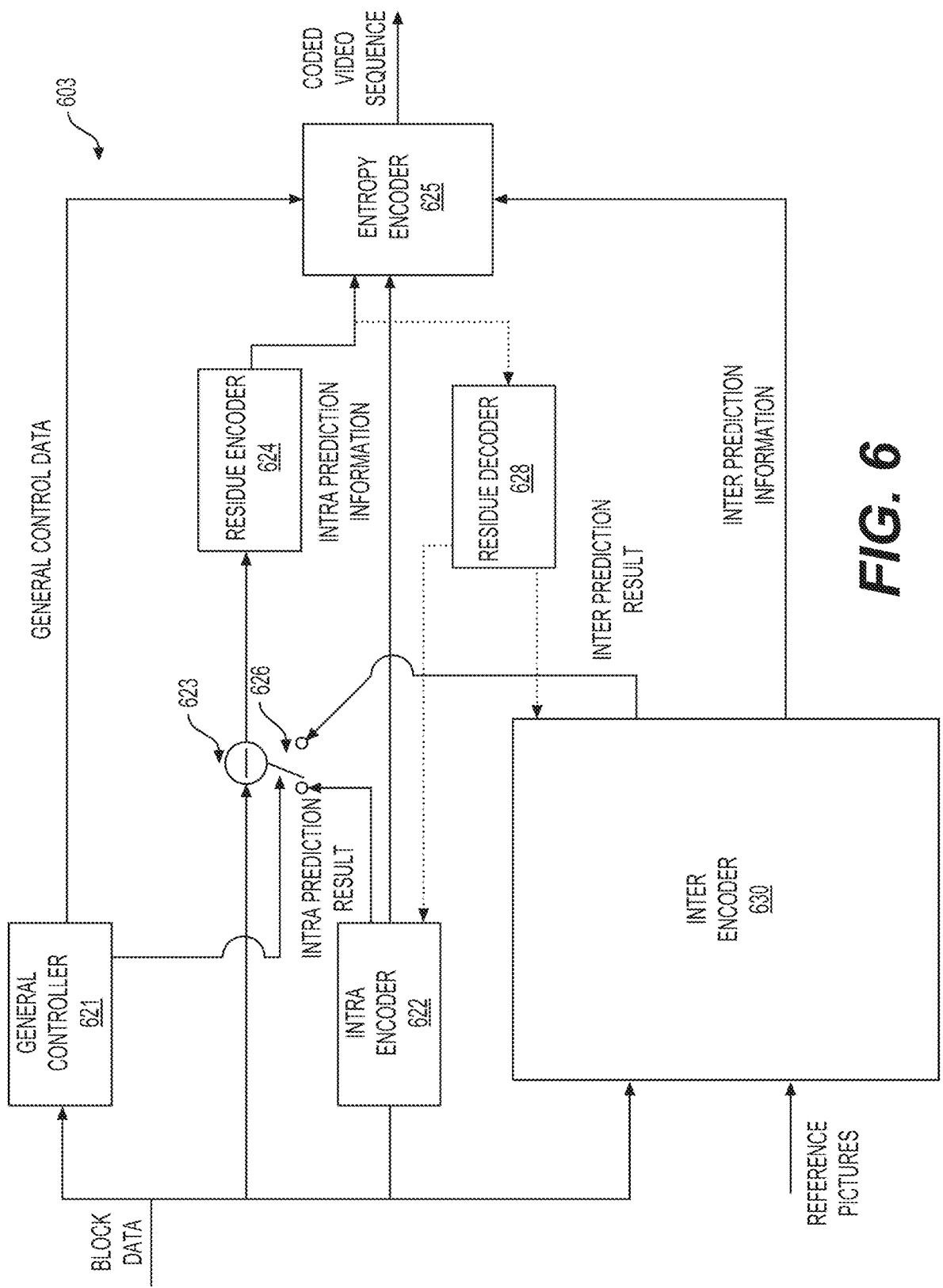
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
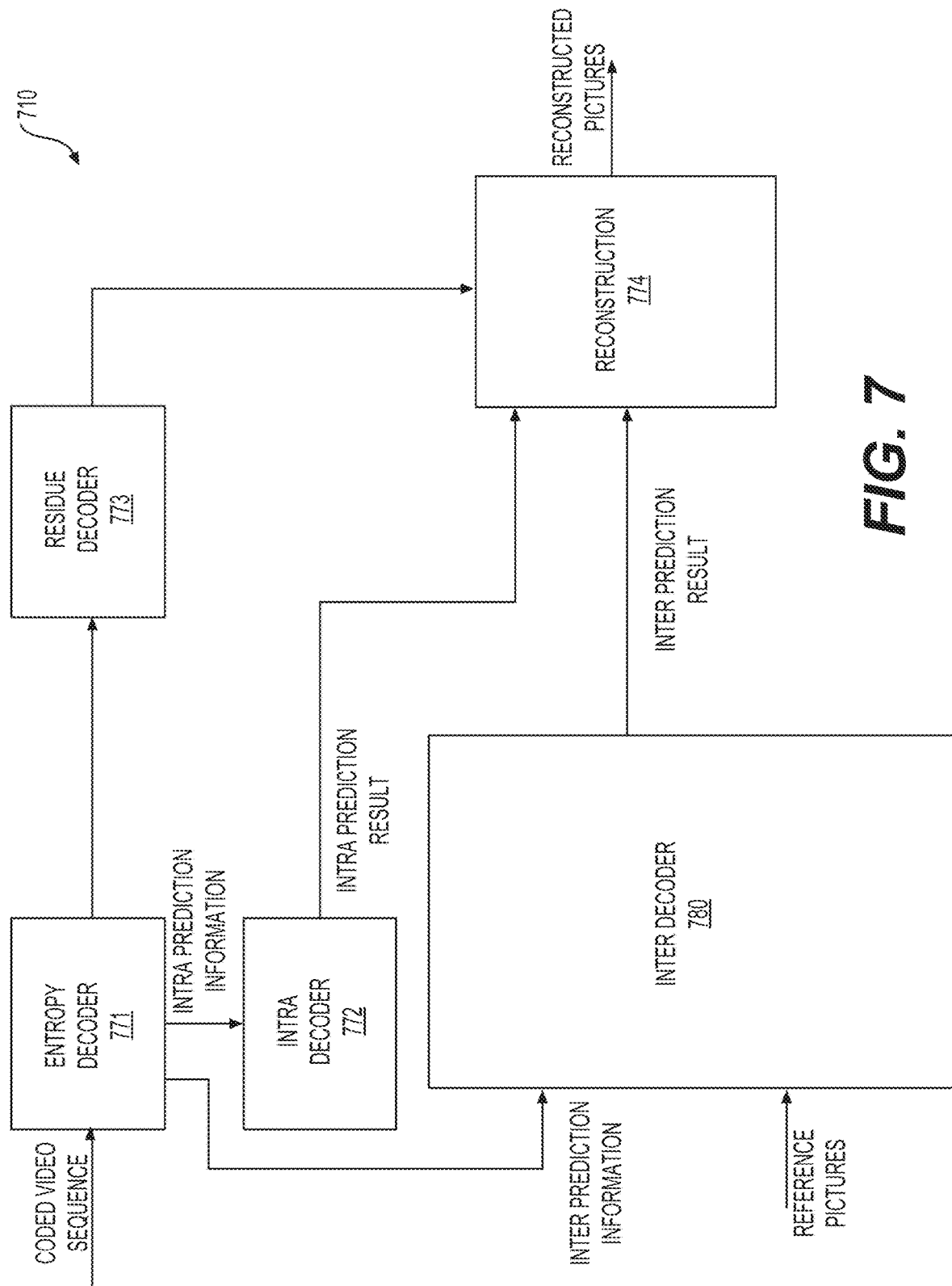
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

II. Inter Prediction Technologies

In various embodiments, for an inter-predicted CU, motion parameters including motion vectors, reference picture indices, reference picture list usage index, and possibly other additional information can be used for inter-predicted sample generation. The motion parameters can be signaled in an explicit or implicit manner. When a CU is coded with a skip mode, the CU is associated with one PU and has no significant residual coefficients, coded motion vector delta, or reference picture indices associated with the CU.

When a merge mode is employed, motion parameters for a current CU can be obtained from neighboring CUs, including spatial and temporal merge candidates, and optionally other merge candidates. The merge mode can be applied to an inter-predicted CU, and may be used for a skip mode. An alternative to the merge mode is an explicit transmission of motion parameters. For example, motion vectors, respective reference picture indices for each reference picture list, reference picture list usage flags, and other needed information can be signaled explicitly per each CU.

The following inter prediction coding tools are used in some embodiments:
  Extended merge prediction
  Merge mode with motion vector difference (MMVD)
  Advanced motion vector prediction (AMVP) mode with symmetric motion vector difference (MVD) signaling
  Affine motion compensated prediction
  Sub-block-based temporal motion vector prediction (SbTMVP)
  Adaptive motion vector resolution (AMVR)
  Bi-prediction with weighted averaging (BWA)
  Bi-directional optical flow (BDOF)
  Decoder side motion vector refinement (DMVR)
  Triangle partition prediction
  Combined inter and intra prediction (CIIP)

1. Extended Merge Prediction

In some embodiments, a merge candidate list is constructed by including the following five types of candidates in order:

1) Spatial motion vector predictor (SMVP) from spatial neighbor CUs,
2) Temporal motion vector predictor (TMVP) from collocated CUs,
3) History-based motion vector predictor (HMVP) from a first-in-first-out (FIFO) table,
4) Pairwise average motion vector predictor (MVP),
5) Zero MVs.

In some embodiments, the size of the merge list is signaled in a slice header and the maximum allowed size of the merge list is 6. For each CU coded in merge mode, an index of best merge candidate is encoded using truncated unary (TU) binarization. The first bin of the merge index is coded with context, and bypass coding is used for other bins.

Examples of generation processes of each category of merge candidates are described below.

1.1 Spatial Candidates Derivation

Figure 9:
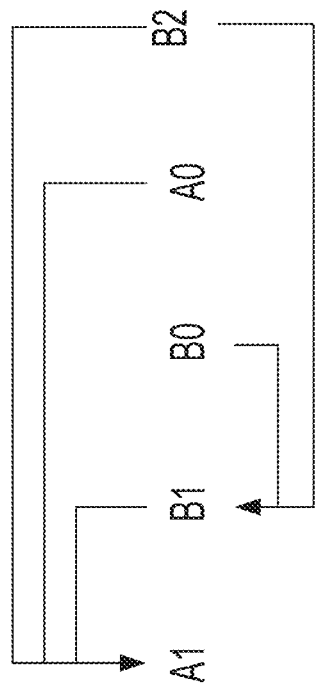
FIG. 9 shows candidate pairs on an extended merge list for a redundancy check process in accordance with an embodiment.
Figure 8:
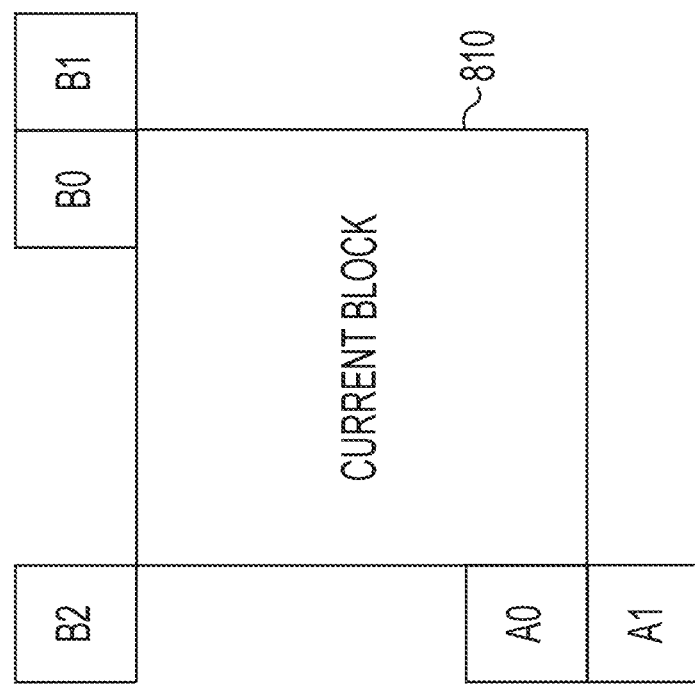
FIG. 8 shows candidate positions from which a set of spatial merge candidates can be selected to construct an extended merge candidate list in accordance with an embodiment.
Figure 11:
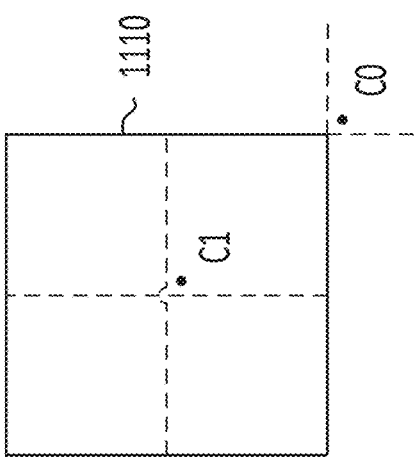
FIG. 11 shows candidate positions from which a temporal merge candidate on an extended merge list can be selected in accordance with an embodiment.

In a process of deriving spatial merge candidates, a maximum of four merge candidates are selected among candidates located in the positions A1, B1, B0, A0 and B2 neighboring a current block (810) in FIG. 8. The order of derivation is A1, B1, B0, A0 and B2. Position B2 is considered when any CU of position A1, B1, B0, A0 is not available (e.g. because it belongs to another slice or tile) or is intra coded. After the candidate at position A1 is added, the addition of the remaining candidates is subject to a redundancy check which ensures that candidates with same motion information are excluded from the list. As a result, coding efficiency is improved. To reduce computational complexity, not all possible candidate pairs are considered in the mentioned redundancy check. Instead, the pairs linked with an arrow in FIG. 9 are considered. A candidate is added to the list when the corresponding candidate used for redundancy check has not the same motion information.

1.2 Temporal Candidates Derivation

Figure 10:
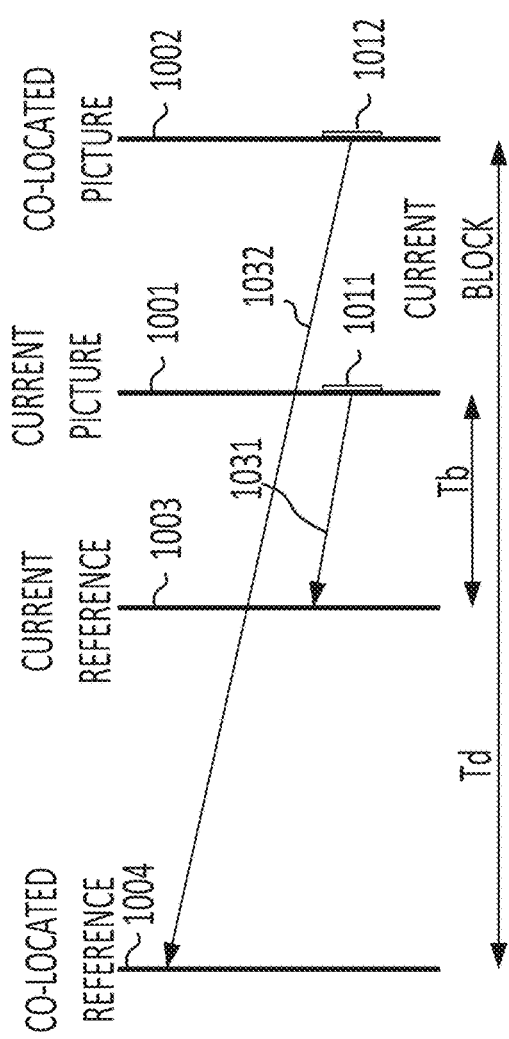
FIG. 10 shows an example of deriving a temporal merge candidate on an extended merge list in a current picture in accordance with an embodiment.

In an embodiment, one temporal candidate is added to the list. Particularly, in the derivation of this temporal merge candidate for a current block (1011) in a current picture (1001), a scaled motion vector (1031) is derived based on a co-located CU (1012) belonging to a collocated reference picture (1002) as shown in FIG. 10. The reference picture list to be used for derivation of the co-located CU is explicitly signaled in the slice header. The scaled motion vector (1031) for the temporal merge candidate is scaled from a motion vector (1032) of the co-located CU (1012) using picture order count (POC) distances, Tb and Td. Tb is defined to be a POC difference between a current reference picture (1003) of the current picture (1001) and the current picture (1001). Td is defined to be a POC difference between a co-located reference picture (1004) of the co-located picture (1002) and the co-located picture (1002). A reference picture index of the temporal merge candidate is set equal to zero.

Figure 1:
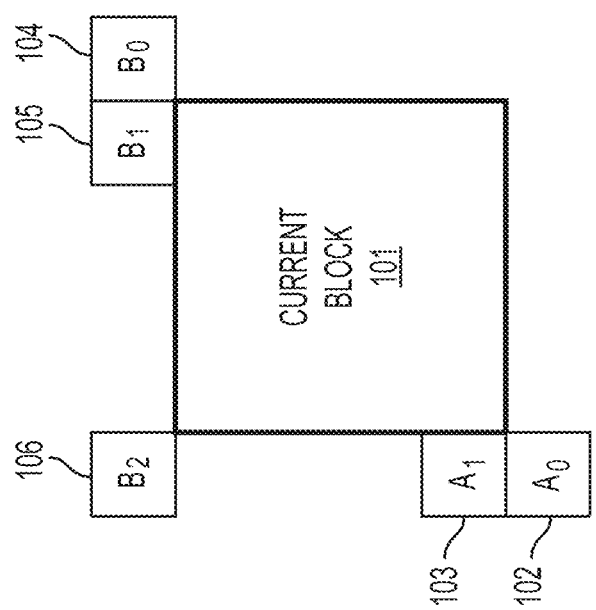
FIG. 1 is a schematic illustration of a current block and its surrounding spatial merge candidates in one example.

The position for the temporal candidate is selected between candidates C0 and C1 shown in FIG. 1. If a CU at position C0 is not available, intra coded, or is outside of the current row of CTUs, the position C1 is used. Otherwise, position C0 is used in the derivation of the temporal merge candidate.

1.3 Pair-Wise Average Merge Candidates Derivation

In some embodiments, pairwise average candidates are generated by averaging predefined pairs of candidates in the existing merge candidate list. For example, the predefined pairs are defined as ((0, 1), (0, 2), (1, 2), (0, 3), (1, 3), (2, 3)), where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

In an embodiment, when the merge list is not full after pair-wise average merge candidates are added, the zero MVPs are inserted in the end until the maximum merge candidate number is encountered.

2. Merge Mode with Motion Vector Difference (MMVD)

In addition to merge mode, where implicitly derived motion information is directly used for prediction samples generation of a current CU, MMVD is used in some embodiments. A MMVD flag is signaled right after sending a skip flag and merge flag to specify whether a MMVD mode is used for a CU.

In an MMVD mode, after a merge candidate is selected, the merge candidate is further refined by signaled motion vector difference (MVD) information to obtain refined motion information. The MVD information includes a merge candidate flag, a distance index to specify a motion magnitude, and an index for indication of a motion direction.

Figure 12:
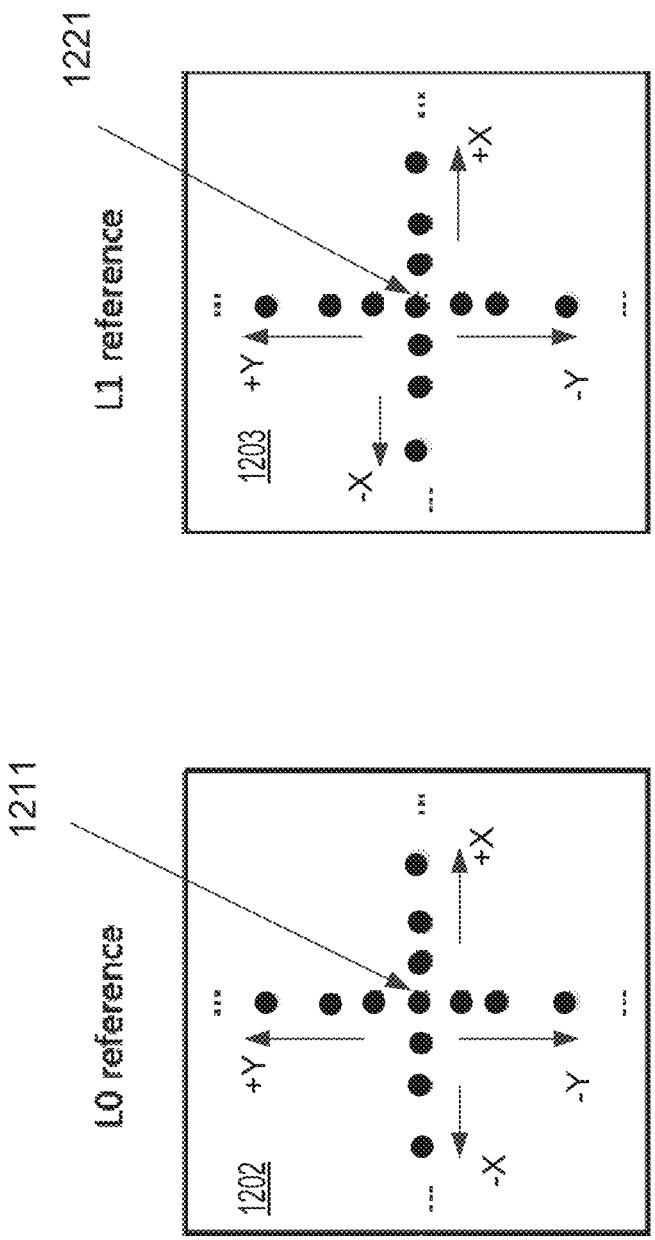
FIG. 12 shows prediction positions from which a prediction can be selected in a merge mode with motion vector difference (MMVD) in accordance with an embodiment.

One of the first two candidates in the merge list is selected to be used as a MV basis (a starting MV(s)). The merge candidate flag is signaled to specify which one is used. As shown in FIG. 12, the MV basis determines a starting point (1211) or (1221) at a reference picture (1202) or (1203) in a reference picture list, L0 or L1, respectively.

The distance index specifies motion magnitude information and indicates a pre-defined offset from the starting point (1211) or (1221). As shown in FIG. 12, an offset is added to either a horizontal component or vertical component of a starting MV (the MV basis) pointing at a position (1211) or (1221). The mapping relationship of a distance index and a pre-defined offset is specified in Table 1.

TABLE 1

| | Distance IDX | | | | | | | |
|---|---|---|---|---|---|---|---|---|
| | 0 | 1 | 2 | 3 | 4 | 5 | 6 | 7 |
| Offset (in unit of luma sample) | 1/4 | 1/2 | 1 | 2 | 4 | 8 | 16 | 32 |

The direction index represents a direction of an MVD relative to the starting point (1211) or (1221). The direction index can represent one of the four directions as shown in Table 2.

TABLE 2

| | Direction IDX | | | |
|---|---|---|---|---|
| | 00 | 01 | 10 | 11 |
| x-axis | + | − | N/A | N/A |
| y-axis | N/A | N/A | + | − |

It is noted that the meaning of an MVD sign can vary according to the information of starting MV(s). When the starting MV(s) is a uni-prediction MV or bi-prediction MVs both pointing to the same side of a current picture (i.e. POCs of two references are both larger than the POC of the current picture, or are both smaller than the POC of the current picture), the sign in Table 2 specifies the sign of MV offset added to the starting MV. When the starting MVs are bi-prediction MVs with the two MVs pointing to different sides of the current picture (i.e. the POC of one reference is larger than the POC of the current picture, and the POC of the other reference is smaller than the POC of the current picture), the sign in Table 2 specifies the sign of MV offset added to the L0 MV component of the starting MV and the sign for the L1 MV has an opposite value.

Based on the basis MV, the offset, and the MVD sign, the final MV(s) can be determined for the current CU.

3. Affine Motion Compensated Prediction

Figures 13A, 13B:
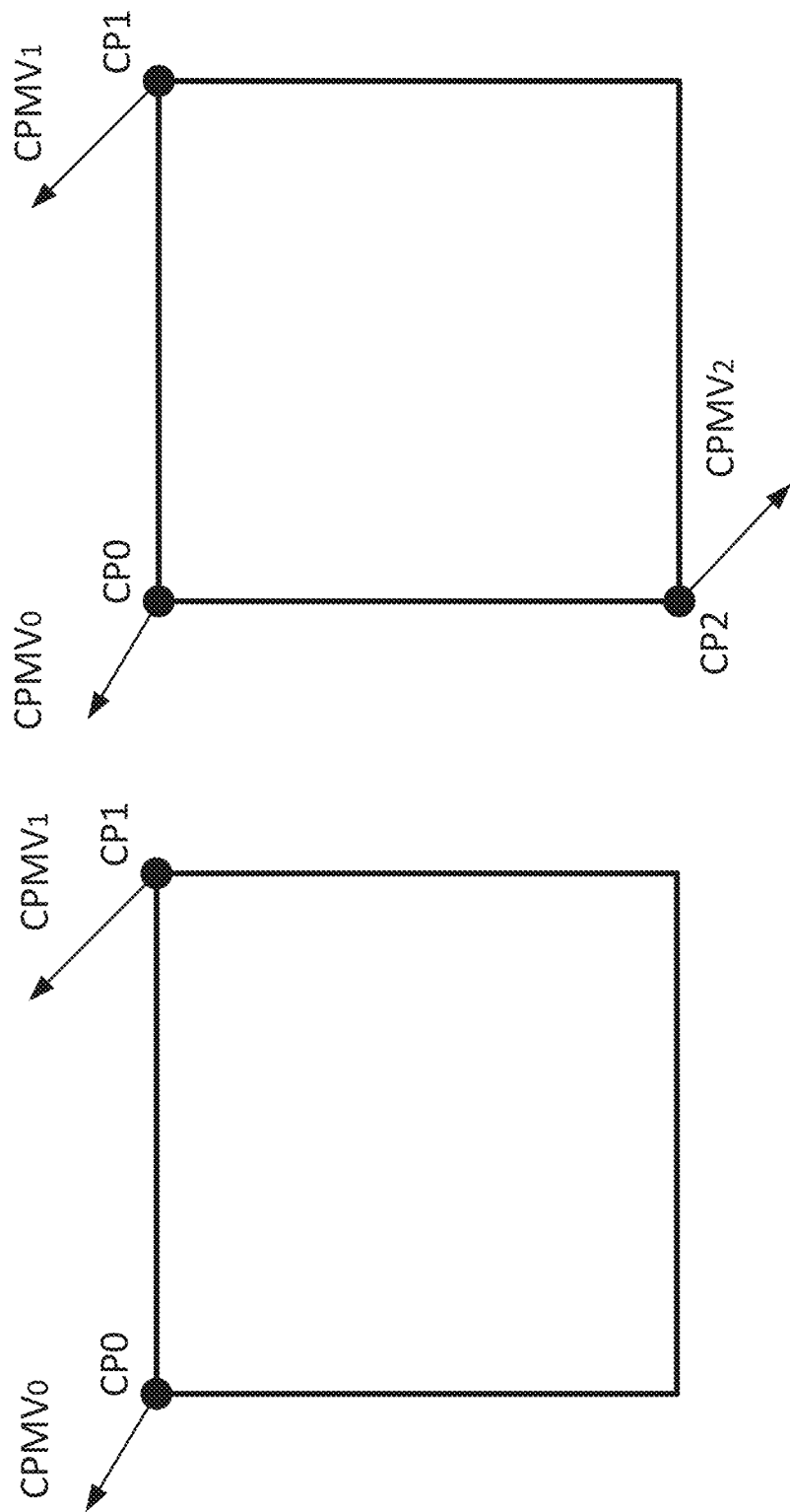
FIG. 13A shows two control point motion vectors (CPMVs) for representing a 2-parameter affine model.
FIG. 13B shows three CPMVs for representing a 3-parameter affine model.

In some examples, a translation motion model is applied for motion compensation—prediction (MCP). However, the translational motion model may not be suitable for modeling other types of motions, such as zoom in/out, rotation, perspective motions, and the other irregular motions. In some embodiments, a block-based affine transform motion compensation prediction is applied. In FIG. 13A, an affine motion field of a block is described by two control point motion vectors (CPMVs), CPMV0 and CPMV1, of two control points (CPs), CP0 and CP1 when a 4-parameter affine model is used. In FIG. 13B, an affine motion field of a block is described by three CPMVs, CPMV0, CPMV1 and CPMV3, of CPs, CP0, CP1, and CP2 when a 6-parameter affine model is used.

For a 4-parameter affine motion model, a motion vector at a sample location (x,y) in a block is derived as:

$$\begin{cases} mv_x = \frac{mv_{1x} - mv_{0x}}{W}x + \frac{mv_{1y} - mv_{0y}}{W}y + mv_{0x} \\ mv_y = \frac{mv_{1y} - mv_{0y}}{W}x + \frac{mv_{1y} - mv_{0x}}{W}y + mv_{0y} \end{cases} \quad (Eq.\ 1)$$

For a 6-parameter affine motion model, a motion vector at sample location (x,y) in a block is derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} \quad (Eq.\ 2)$$

In the expressions (2.1) and (2.2), $(mv_{0x}, mv_{0y})$ is a motion vector of the top-left corner control point, $(mv_{1x}, mv_{1y})$ is motion vector of the top-right corner control point, and $(mv_{2x}, mv_{2y})$ is motion vector of the bottom-left corner control point. In addition, the coordinate (x,y) is with respect to the top-left corner of the respective block, and W and H denotes the width and height of the respective block.

Figure 14:
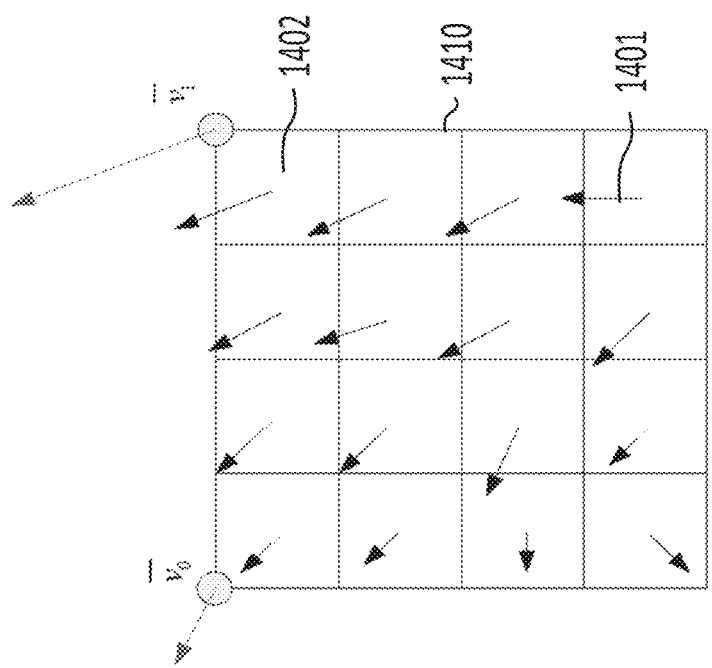
FIG. 14 shows motion vectors derived for sub-blocks partitioned from a current block coded with an affine prediction mode.

In order to simplify the motion compensation prediction, a sub-block based affine transform prediction is applied in some embodiments. For example, in FIG. 14, the 4-parameter affine motion model is used, and two CPMVs, $\vec{v}_0$ and $\vec{v}_1$, are determined. To derive a motion vector of each 4×4 (samples) luma sub-block (1402) partitioned from the current block (1410), a motion vector (1401) of the center sample of each sub-block (1402) is calculated according to above expressions (2.1), and rounded to a 1/16 fraction accuracy. Then, motion compensation interpolation filters are applied to generate a prediction of each sub-block (1402) with the derived motion vector (1401). The sub-block size of chroma-components is set to be 4×4. A MV of a 4×4 chroma sub-block is calculated as the average of the MVs of the four corresponding 4×4 luma sub-blocks.

Similar to translational motion inter prediction, two affine motion inter prediction modes, affine merge mode and affine AMVP mode, are employed in some embodiments.

3.1 Affine Merge Prediction

In some embodiments, an affine merge mode can be applied for CUs with both width and height larger than or equal to 8. Affine merge candidates of a current CU is generated based on motion information of spatial neighboring CUs. There can be up to five affine merge candidates and an index is signaled to indicate the one to be used for the current CU. For example, the following three types of affine merge candidates are used to form an affine merge candidate list:

(i) Inherited affine merge candidates that are extrapolated from CPMVs of the neighbor CUs;
(ii) Constructed affine merge candidates that are derived using the translational MVs of the neighbor CUs: and
(iii) Zero MVs.

In some embodiments, there can be at most two inherited affine candidates which are derived from affine motion models of the neighboring blocks, one from left neighboring CUs and one from above neighboring CUs. The candidate blocks, for example, can be located at positions shown in FIG. 8. For the left predictor, the scan order is A0->A1, and for the above predictor, the scan order is B0->B1->B2. Only the first inherited candidate from each side is selected. No pruning check is performed between two inherited candidates.

Figure 15:
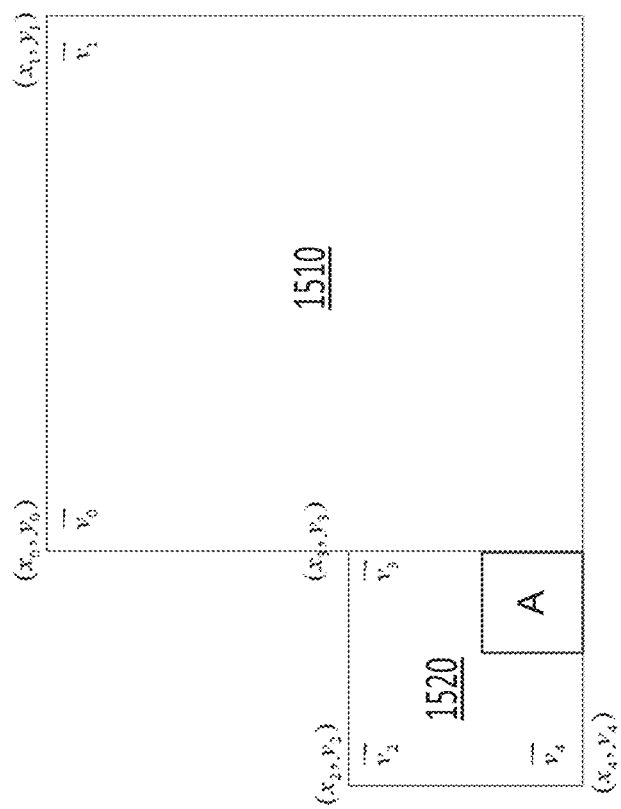
FIG. 15 shows a neighbor block of a current block for deriving an inherited affine merge candidate.

When a neighboring affine CU is identified, CPMVs of the identified neighboring affine CU are used to derive a CPMV candidate in the affine merge list of the current CU. As shown in FIG. 15, a neighbor left bottom block A of a current CU (1510) is coded in an affine mode. Motion vectors, $\vec{v}_2$, $\vec{v}_3$ and $\vec{v}_4$ of the top left corner, above right corner and left bottom corner of a CU (1520) which contains the block A are attained. When block A is coded with a 4-parameter affine model, two CPMVs $\vec{v}_0$ and $\vec{v}_1$ of the current CU (1510) are calculated according to $\vec{v}_2$, and $\vec{v}_3$. In case that block A is coded with 6-parameter affine model, three CPMVs (not shown) of the current CU are calculated according to $\vec{v}_2$, $\vec{v}_3$ and $\vec{v}_4$.

Constructed affine candidates are constructed by combining neighbor translational motion information of each control point. The motion information for the control points is derived from specified spatial neighbors and temporal neighbor shown in FIG. 16. CPMVk (k=1, 2, 3, 4) represents the k-th control point. For CPMV1, the B2->B3->A2 blocks are checked in order and the MV of the first available block is used. For CPMV2, the B1->B0 blocks are checked and for CPMV3, the A1->A0 blocks are checked. A TMVP at block T is used as CPMV4 if available.

After MVs of four control points are attained, affine merge candidates are constructed based on that motion information. The following combinations of control point MVs are used to construct in order: {CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2}, {CPMV1, CPMV3}.

The combination of 3 CPMVs constructs a 6-parameter affine merge candidate and the combination of 2 CPMVs constructs a 4-parameter affine merge candidate. To avoid a motion scaling process, if the reference indices of control points are different, the related combination of control point MVs is discarded.

After inherited affine merge candidates and constructed affine merge candidates are checked, if the list is still not full, zero MVs are inserted to the end of the merge candidate list.

3.2 Affine AMVP Prediction

In some embodiments, affine AMVP mode can be applied for CUs with both width and height larger than or equal to 16. An affine flag in CU level is signaled in the bitstream to indicate whether affine AMVP mode is used and then another flag is signaled to indicate whether 4-parameter affine or 6-parameter affine is used. A difference of the CPMVs of current CU and their predictors is signaled in the bitstream. An affine AMVP candidate list size is 2, and can be generated by using the following four types of CPMV candidate in order:

(i) Inherited affine AMVP candidates that are extrapolated from the CPMVs of the neighbor CUs;
(ii) Constructed affine AMVP candidates that are derived using the translational MVs of the neighbor CUs;
(iii) Translational MVs from neighboring CUs; and
(iv) Zero MVs.

The checking order of inherited affine AMVP candidates is similar to the checking order of inherited affine merge candidates in an example. The difference is that, for AMVP candidate, the affine CU that has the same reference picture as in current block is considered. No pruning process is applied when inserting an inherited affine motion predictor into the candidate list.

Figure 16:
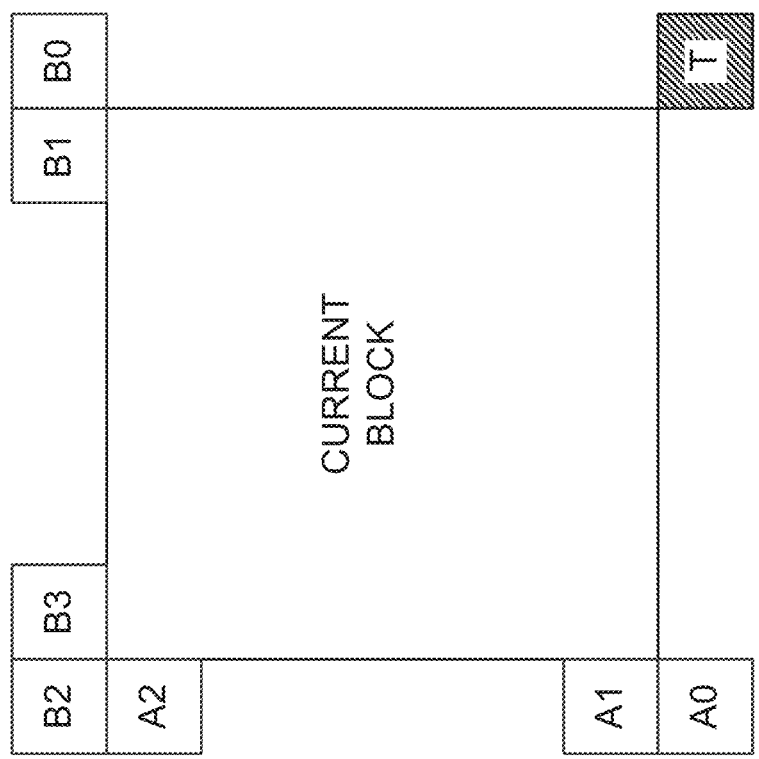
FIG. 16 shows candidate block positions for deriving constructed affine merge candidates.

Constructed AMVP candidate is derived from the specified spatial neighbors shown in FIG. 16. A same checking order is used as done in affine merge candidate construction. In addition, a reference picture index of a neighboring block is also checked. The first block in the checking order that is inter coded and has the same reference picture as in current CUs is used. When the current CU is coded with a 4-parameter affine model, and CPMV0 and CPMV1 are both available, the available CPMVs are added as one candidate in the affine AMVP list. When the current CU is coded with 6-parameter affine mode, and all three CPMVs (CPMV0, CPMV1, and CPMV2) are available, the available CPMVs are added as one candidate in the affine AMVP list. Otherwise, constructed AMVP candidates are set as unavailable.

If affine AMVP list candidates is still less than 2 after inherited affine AMVP candidates and constructed AMVP candidate are checked, translational motion vectors neighboring the control points will be added to predict all control point MVs of the current CU, when available. Finally, zero MVs are used to fill the affine AMVP list if the affine AMVP list is still not full.

4. Sub-Block-Based Temporal Motion Vector Prediction (SbTMVP)

Figure 17A:
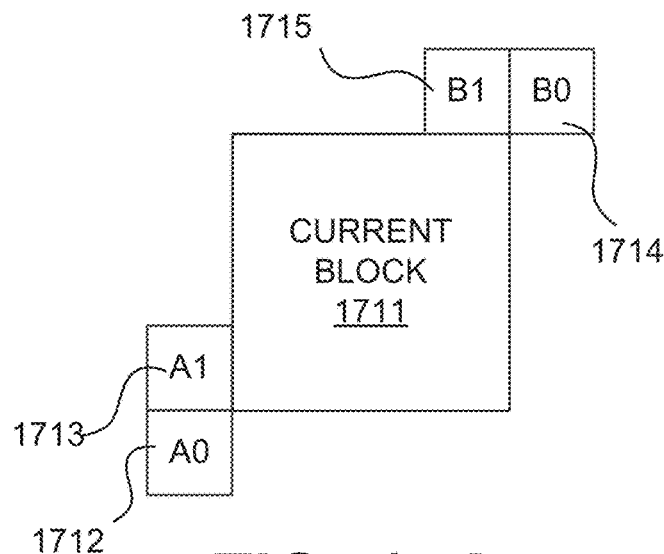
FIG. 17A is a schematic illustration of spatial neighboring blocks that can be used to determine predicting motion information for a current block using a sub-block based temporal motion vector prediction (SbTMVP) method based on motion information of the spatial neighboring blocks in accordance with one embodiment.

FIG. 17A is a schematic illustration of spatial neighboring blocks that can be used to determine predicting motion information for a current block (1711) using a sub-block based temporal MV prediction (SbTMVP) method in accordance with one embodiment. FIG. 17A shows a current block (1711) and its spatial neighboring blocks denoted A0, A1, B0, and B1 (1712, 1713, 1714, and 1715, respectively). In some examples, spatial neighboring blocks A0, A1, B0, and B1 and the current block (1711) belong to a same picture.

Figure 17B:
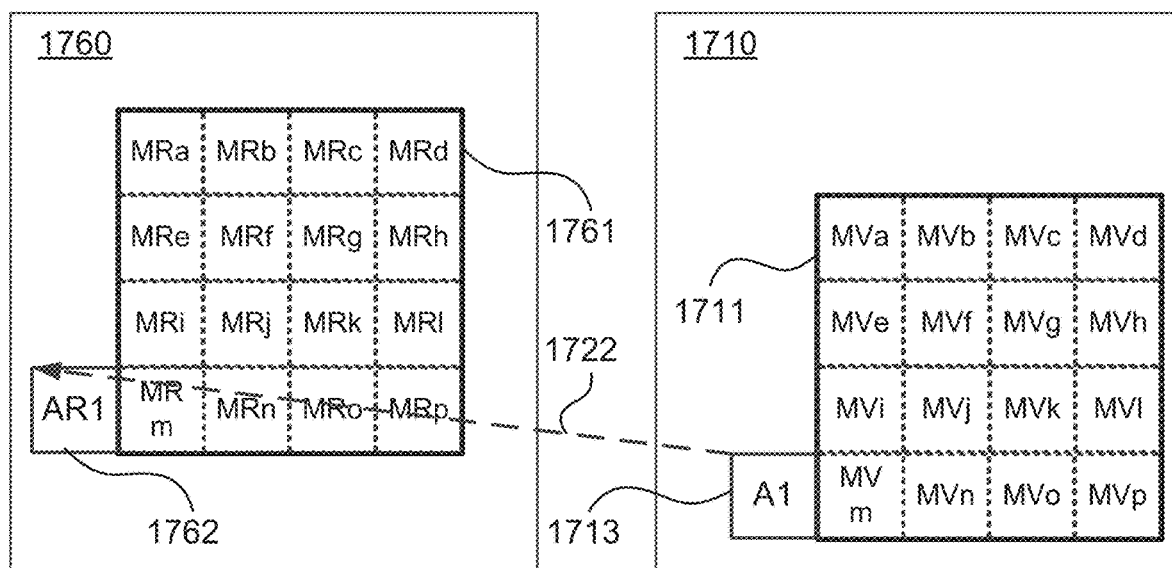
FIG. 17B is a schematic illustration of a selected spatial neighboring block for a SbTMVP method in accordance with one embodiment.

FIG. 17B is a schematic illustration of determining motion information for sub-blocks of the current block (1711) using the SbTMVP method based on a selected spatial neighboring block, such as block A1 in this non-limiting example, in accordance with an embodiment. In this example, the current block (1711) is in a current picture (1710), and a reference block (1761) is in a reference picture (1760) and can be identified based on a motion shift (or displacement) between the current block (1711) and the reference block (1761) indicated by a motion vector (1722).

In some embodiments, similar to a temporal motion vector prediction (TMVP) in HEVC, a SbTMVP uses the motion information in various reference sub-blocks in a reference picture for a current block in a current picture. In some embodiments, the same reference picture used by TMVP can be used for SbTMVP. In some embodiments, TMVP predicts motion information at a CU level but SbTMVP predicts motion at a sub-CU level. In some embodiments, TMVP uses the temporal motion vectors from collocated block in the reference picture, which has a corresponding position adjacent to a lower-right corner or a center of a current block, and SbTMVP uses the temporal motion vectors from a reference block, which can be identified by performing a motion shift based on a motion vector from one of the spatial neighboring blocks of the current block.

For example, as shown in FIG. 17A, neighboring blocks A1, B1, B0, and A0 can be sequentially checked in a SbTMVP process. As soon as a first spatial neighboring block that has a motion vector that uses the reference picture (1760) as its reference picture is identified, such as block A1 having the motion vector (1722) that points to a reference block AR1 in the reference picture (1760) for example, this motion vector (1722) can be used for performing the motion shift. If no such motion vector is available from the spatial neighboring blocks A1, B1, B0, and A0, the motion shift is set to (0, 0).

After determining the motion shift, the reference block (1761) can be identified based on a position of the current block (1711) and the determined motion shift. In FIG. 17B, the reference block (1761) can be further divided into 16 sub-blocks with reference motion information MRa through MRp. In some examples, the reference motion information for each sub-block in the reference block (1761) can be determined based on a smallest motion grid that covers a center sample of such sub-block. The motion information can include motion vectors and corresponding reference indices. The current block (1711) can be further divided into 16 sub-blocks, and the motion information MVa through MVp for the sub-blocks in the current block (1711) can be derived from the reference motion information MRa through MRp in a manner similar to the TMVP process, with temporal scaling in some examples.

The sub-block size used in the SbTMVP process can be fixed (or otherwise predetermined) or signaled. In some examples, the sub-block size used in the SbTMVP process can be 8×8 samples. In some examples, the SbTMVP process is only applicable to a block with a width and height equal to or greater than the fixed or signaled size, for example 8 pixels.

In an example, a combined sub-block based merge list which contains a SbTVMIP candidate and affine merge candidates is used for the signaling of a sub-block based merge mode. The SbTVMP mode can be enabled or disabled by a sequence parameter set (SPS) flag. In some examples, if the SbTMVP mode is enabled, the SbTMVP candidate is added as the first entry of the list of sub-block based merge candidates, and followed by the affine merge candidates. In some embodiments, the maximum allowed size of the sub-block based merge list is set to five. However, other sizes may be utilized in other embodiments.

In some embodiments, the encoding logic of the additional SbTMVP merge candidate is the same as for the other merge candidates. That is, for each block in a P or B slice, an additional rate-distortion check can be performed to determine whether to use the SbTMVP candidate.

5. Prediction Refinement with Optical Flow (PROF)

Affine motion model parameters can be used to derive the motion vector of each pixel in a CU. However, due to the high complexity and memory access bandwidth requirements for performing pixel-based affine prediction, in some embodiments, a sub-block-based affine motion compensation method is implemented. In some embodiments, a current block (e.g., a CU) can be divided into sub-blocks each having a size of 4×4 and assigned with a sub-block MV derived from the CPMVs of the current block. The sub-block-based affine motion compensation is a trade-off between improving coding efficiency, complexity, and memory access bandwidth, in exchange of decreased prediction accuracy.

In some embodiments, a prediction refinement with optical flow (PROF) method may be implemented to improve the sub-block-based affine motion compensation to have a finer granularity of motion compensation. According to the PROF method, after the sub-block-based affine motion compensation is performed, predicted samples (e.g., luma or chroma) can be refined by adding a set of adjustment values derived based on an optical flow equation.

Figure 18:
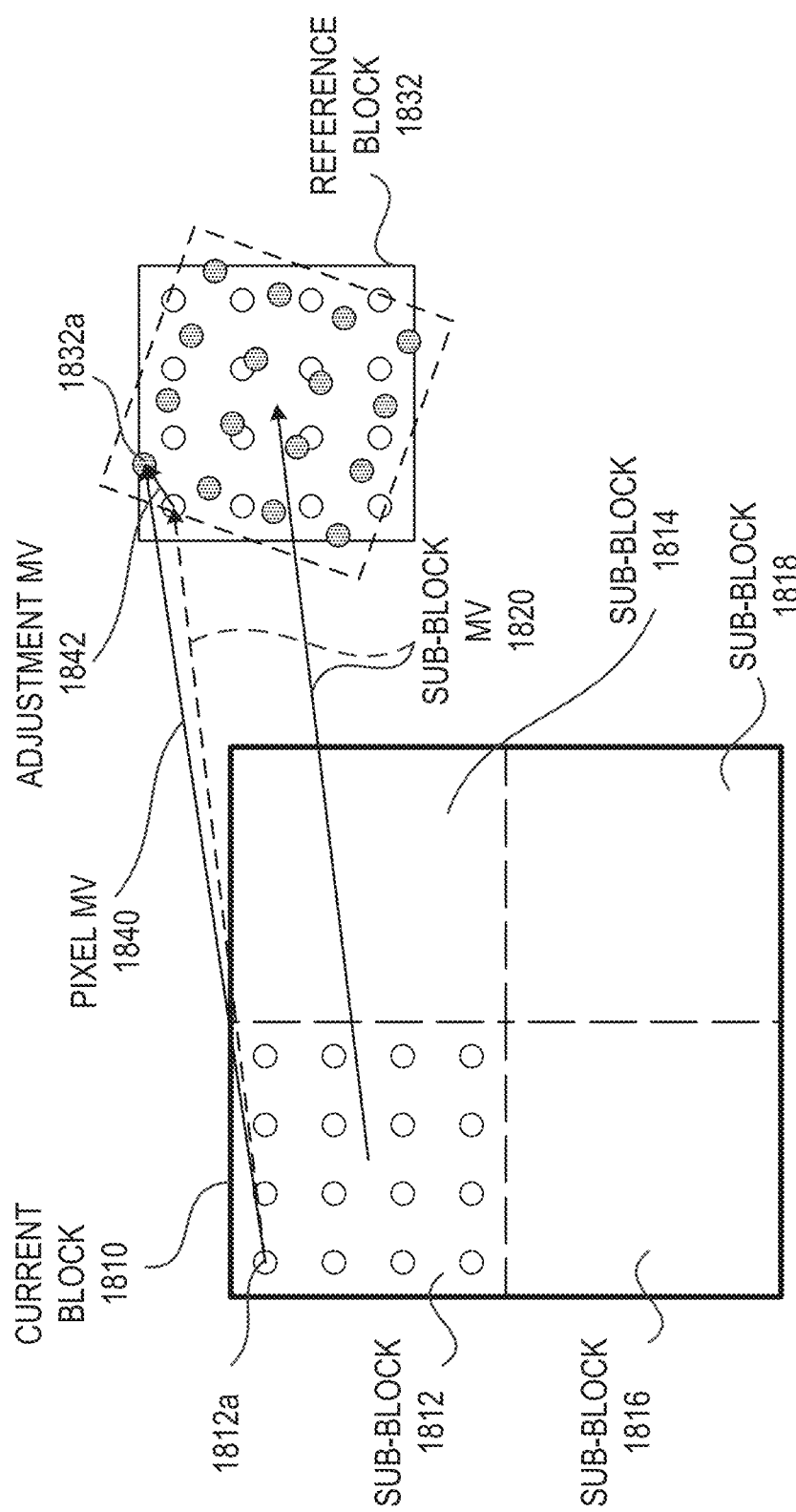
FIG. 18 is a schematic illustration of an example of a prediction refinement with optical flow (PROF) method in accordance with an embodiment.

FIG. 18 is a schematic illustration of an example of the PROF method in accordance with an embodiment. In the example shown in FIG. 18, a current block (1810) is divided into four sub-blocks (1812, 1814, 1816, and 1818). Each one of the sub-blocks (1812, 1814, 1816, and 1818) has a size of 4×4 pixels. A sub-block MV (1820) for the sub-block (1812) at a center location of the sub-block (1812) can be derived according to CPMVs of the current block 1810 (representing an affine model) and point to a reference sub-block (1832). Initial sub-block predicted samples can be determined according to the reference sub-block (1832).

Refinement values to be applied to the initial sub-block predicted samples can be calculated as if each predicted sample is at a position (e.g., position (1832a) for sample (1812a)) indicated by a pixel MV (e.g., pixel MV (1840)). For example, the pixel MV (1840) can be calculated according the affine model represented by the CPMVs. A difference (referred to as an adjustment vector) ΔV (1842) between the pixel MV (1840) and the sub-block MV (1820) can accordingly be determined. Subsequently, using an optical flow approach, the refinement value corresponding to the pixel (1812a) can be determined based on the adjustment vector ΔV (1842).

In an example, the PROF method may begin with performing the sub-block-based affine motion compensation to generate an initial sub-block prediction (may also be referred to as an initial predicted sub-block) (e.g., the block (1832)) including samples represented by I(i,j), where i and j are coordinates corresponding to a particular sample at position (i,j) in the current sub-block. Next, the spatial gradients $g_x(i,j)$ and $g_y(i,j)$ of the initial sub-block predication at each sample location (i,j) can be calculated using, for example, a 3-tap filter [−1, 0, 1] according to $$g_x(i,j)=I(i+1,j)-I(i-1,j), \text{ and} \quad \text{(Eq. 3)}$$

$$g_y(i,j)=I(i,j+1)-I(i,j-1). \quad \text{(Eq. 4)}$$

The sub-block prediction can be extended by one pixel on each side for the gradient calculation. In some embodiments, to reduce the memory bandwidth and complexity, the pixels on the extended borders can be copied from the nearest integer pixel position in the reference picture (e.g., a reference picture including the block (1832)). Therefore, additional interpolation for a padding region is avoided.

Afterwards, a prediction refinement can be calculated by the following optical flow equation:

$$\Delta I(i,j)=g_x(i,j)*\Delta v_x(i,j)+g_y(i,j)*\Delta v_y(i,j), \quad \text{(Eq. 5)}$$

where the Δv(i,j) (e.g., ΔV (1842)) is the difference between a pixel MV (e.g. pixel MC (1840)) for a sample location (i,j), denoted by v(i,j), and the sub-block MV of the sub-block (e.g., sub-block MV 1820) to which the pixel location (i,j) belongs. Since the affine model parameters and the pixel location relative to the sub-block center are not changed from sub-block to sub-block, Δv(i,j) can be calculated for the first sub-block, and reused for other sub-blocks in the same CU. In some examples, let x and y be the horizontal and vertical position of Δv(i,j) with respect to the center of the sub-block, Δv(i,j) can be derived by the following equation, $$\begin{cases} \Delta v_x(x,y) = a*x+b*y \\ \Delta v_y(x,y) = c*x+d*y \end{cases} \quad \text{(Eq. 6)}$$

where $\Delta v_x(x,y)$ is the x component of Δv(i,j), and $\Delta v_y(x,y)$ is the y component of Δv(i,j).

For a 4-parameter affine model, $$\begin{cases} a = d = \dfrac{v_{1x} - v_{0x}}{w} \\ c = -b = \dfrac{v_{1y} - v_{0y}}{w} \end{cases}, \text{ and} \quad \text{(Eq. 7)}$$

for a 6-parameter affine model, $$\begin{cases} a = \dfrac{v_{1x} - v_{0x}}{w} \\ b = \dfrac{v_{2x} - v_{0x}}{h} \\ c = \dfrac{v_{1y} - v_{0y}}{w} \\ d = \dfrac{v_{2y} - v_{0y}}{h} \end{cases} \quad \text{(Eq. 8)}$$

where $(v_{0x}, v_{0y})$, $(V_{1x}, V_{1y})$, and $(v_{2x}, v_{2y})$ are the upper-left, upper-right, and lower-left control point motion vectors, and w and h are the width and height of a current block including the current sub-block.

Finally, the prediction refinement ΔI(i,j) can be added to the initial sub-block prediction sample I(i,j). The final refined prediction sample I' according to the PROF method can be generated using the following equation:

$$I'(i,j)=I(i,j)+\Delta I(i,j). \quad \text{(Eq. 9)}$$

6. Prediction Refinement Based on Local Illumination Compensation (LIC)

6.1 Local Illumination Compensation

Local illumination compensation (LIC) is a block level coding mode used in some embodiments. LIC may be switched on and off at coding unit (CU) level in some examples.

LIC is based on a linear model for illumination changes, using a scaling factor a and an offset b. A prediction by LIC based on a conventional inter prediction can be generated according to, $$\text{Pred}_{LIC}=a \cdot \text{Pred}+b, \quad \text{(Eq. 10)}$$

where Pred$_{LIC}$ represents the prediction by LIC, Pred denotes the conventional inter prediction indicated by a motion vector, and a and b are a scaling factor and an offset, respectively.

A final reconstruction of the LIC mode Rec$_{LIC}$ can be derived as follows, $$Rec_{LIC}=Pred_{LIC}+Res=a\cdot Pred+b+Res, \quad (Eq. 11)$$

where Res is the residues (after de-quantization and inverse transform) of the current block.

When the LIC mode is applied for a CU, a least square error method is employed to derive the parameters a and b by using neighbouring samples of the current CU and their corresponding reference samples according to, $$\{a,b\}=\arg\min\{(Rec_{x,y}-Ref_{x',y'})^2\}, \quad (Eq. 12)$$

Where Rec$_{x,y}$ denotes the neighboring reconstructed sample of the current block, and Ref$_{x',y'}$ is the Rec$_{x,y}$'s corresponding sample in a reference picture pointed by a motion vector of the current block.

Figure 19:
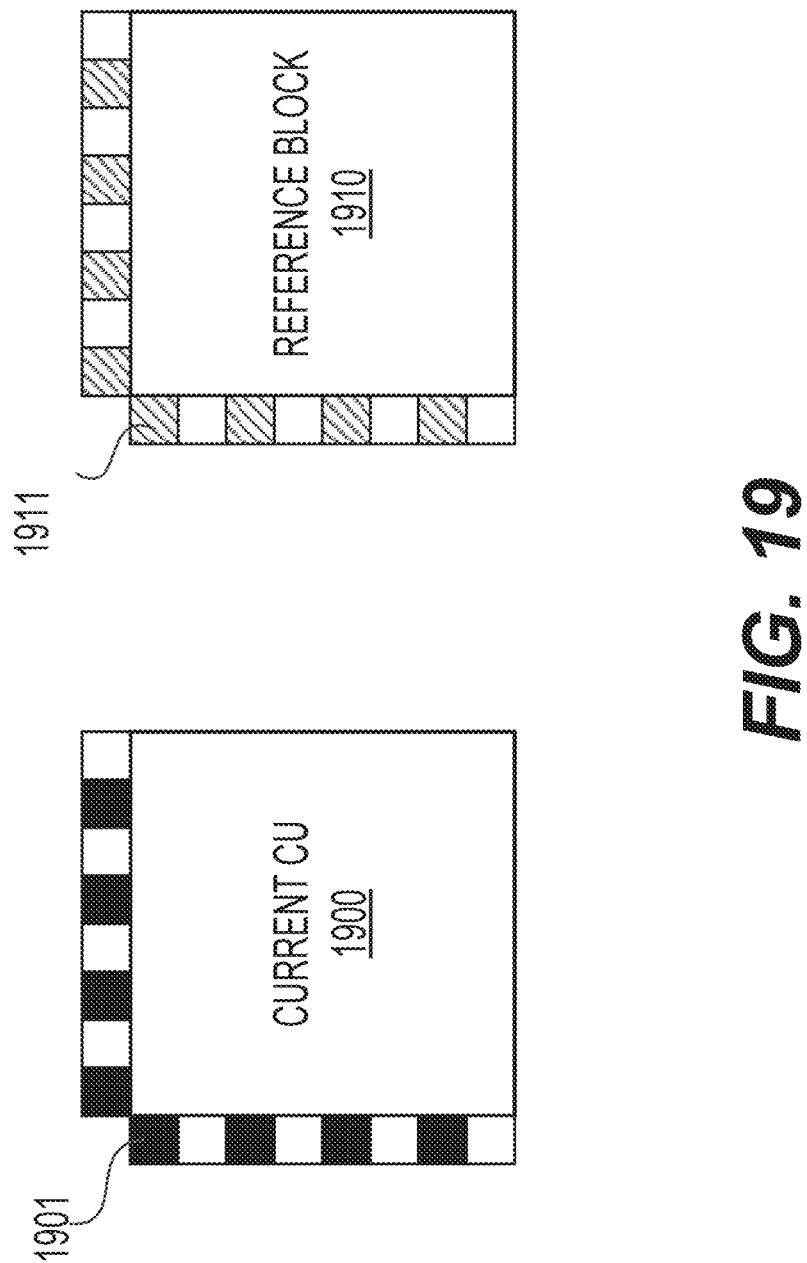
FIG. 19 shows an example of neighboring samples 1901 of a current block 1900 and neighboring samples of a corresponding reference block 1910 used for deriving local illumination compensation (LIC) parameters.

FIG. 19 shows an example of neighboring samples (1901) of a current block (1900) and neighboring samples of a corresponding reference block (1910) used for deriving the LIC parameters a and b. As shown, the subsampled (2:1 subsampling) neighbouring samples (1901) of the CU (1900) and the corresponding samples (1911) (identified by motion information of the current CU (1900) (or sub-CU)) in the reference picture are used. The LIC parameters can be derived and applied for each prediction direction separately in an example.

When a CU is coded with merge mode, an LIC flag can be copied from one of the neighbouring blocks in a way similar to motion information copy in merge mode. Otherwise, an LIC flag can be signalled for the CU to indicate whether LIC is applied or not.

When the LIC mode is enabled for a picture, additional CU level rate-distortion (RD) check can be performed to determine whether the LIC mode is to be applied or not for a CU. In an example, when LIC is enabled for a CU, a mean-removed sum of absolute difference (MR-SAD) and a mean-removed sum of absolute Hadamard-transformed difference (MR-SATD) are used, instead of SAD and SATD, for integer pel motion search and fractional pel motion search, respectively.

6.2 Unidirectional Illumination Compensation

A modified method of LIC, referred to as uni-directional illumination compensation, is employed in some embodiments. For example, in the uni-directional illumination compensation, the linear model parameters derivation is kept unchanged. The modified LIC is applied on a CU basis. The modified LIC is not applied to sub-block based inter prediction (such as advance temporal motion vector prediction (ATMVP) or affine), triangular partition, multi hypothesis intra inter and bi-directional prediction.

Figure 20:
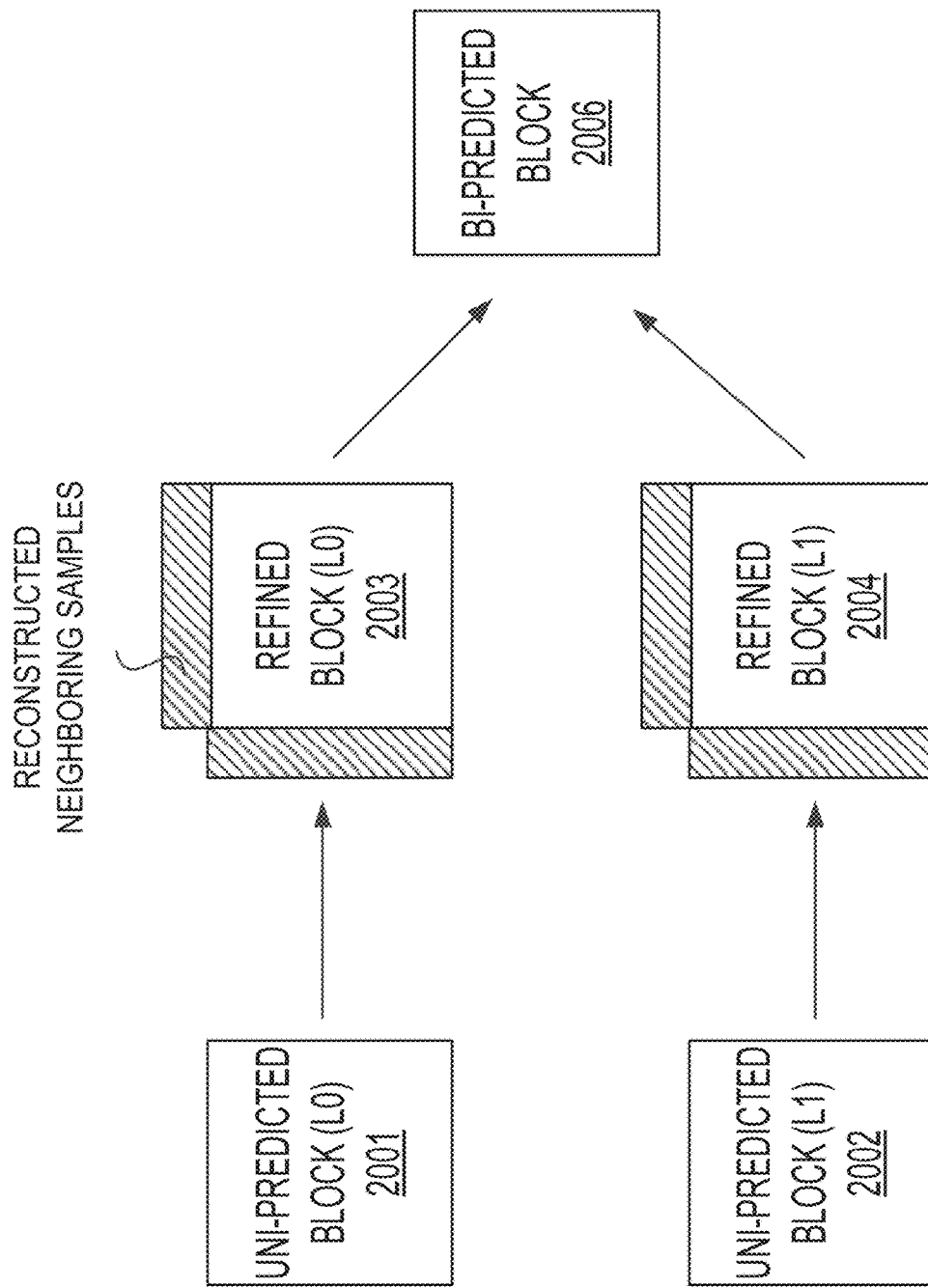
FIG. 20 shows an example when local illumination compensation (LIC) is used with bi-prediction.

FIG. 20 shows an example when LIC is used with bi-prediction. Uni-predicted blocks (2001)-(2002) at directions L0 and L, respectively, can first be obtained. Then, refined blocks (2003)-(2004) can be obtained by performing LIC with reconstructed neighbor samples (2005). Finally, a weighted average can be performed based on the refined blocks (2003)-(2004) to generate a bi-prediction block (2006).

In contrast to FIG. 20, in the modified method, LIC is not applied to bi-directional prediction in some examples because the reconstructed neighboring samples (2005) of the current block are not required to perform inter prediction in an inter pipeline and thus are not available for each uni-directional inter prediction, which otherwise would be required for LIC. In addition, having LIC applied to bi-directional prediction introduces an additional stage to performing LIC process before the weighting operation.

Figure 21:
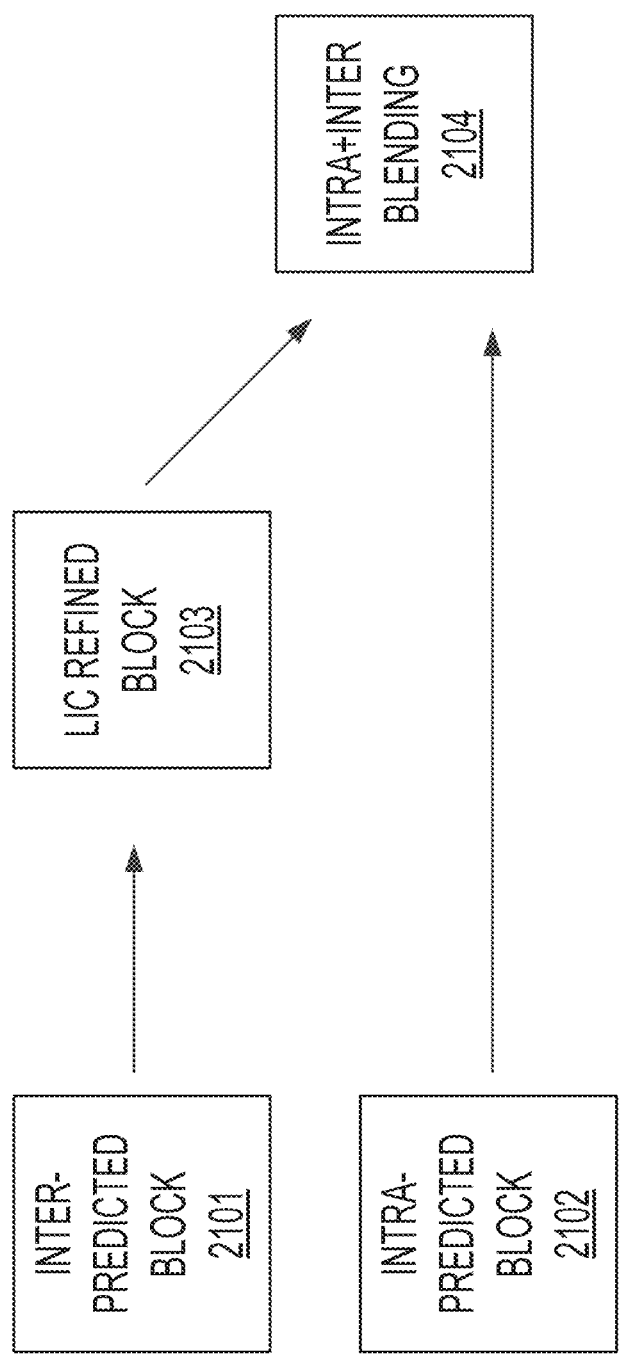
FIG. 21 shows an example when LIC is used with multi hypothesis intra inter.

FIG. 21 shows an example when LIC is used with multi hypothesis intra inter. An inter-predicted block (2101) and an intra-predicted block (2102) can first be generated. An LIC can be performed to obtain a refined block (2103) based on the inter-predicted block (2101). Finally, an inter-intra blended block (2104) can be generated by performing a weighted average to the intra-coded block (2102) and the refined block (2103).

In contrast to FIG. 21, in some examples, LIC processing is not applied for the multi hypothesis intra inter because the LIC processing is applied after inter prediction and before the weighted average, which would delay the weighting between intra- and inter-predicted blocks.

An LIC flag can be included as a part of motion information in addition to MVs and reference indices in merge mode. For example, when a merge candidate list is constructed, LIC flags can be inherited from neighbor blocks for merge candidates. In some examples, the LIC flags are not used for motion vector pruning for simplification purpose. In an example, LIC flags are not stored in motion vector buffer of a reference picture, so LIC flags can be set equal to false for TMVP mode. In an example, LIC flags are set equal to false for bi-directional merge candidates (such as pair-wise average candidate and zero motion candidates). When the LIC tool is not applied, LIC flags are not signaled in an example.

6.3 Applying LIC Processing for Affine Prediction

In some embodiments, the LIC can be extended to affine coded CUs. For example, the derivation of linear model parameters is kept unchanged and several methods can be used for fetching reference samples of an affine coded CU.

Figure 22:
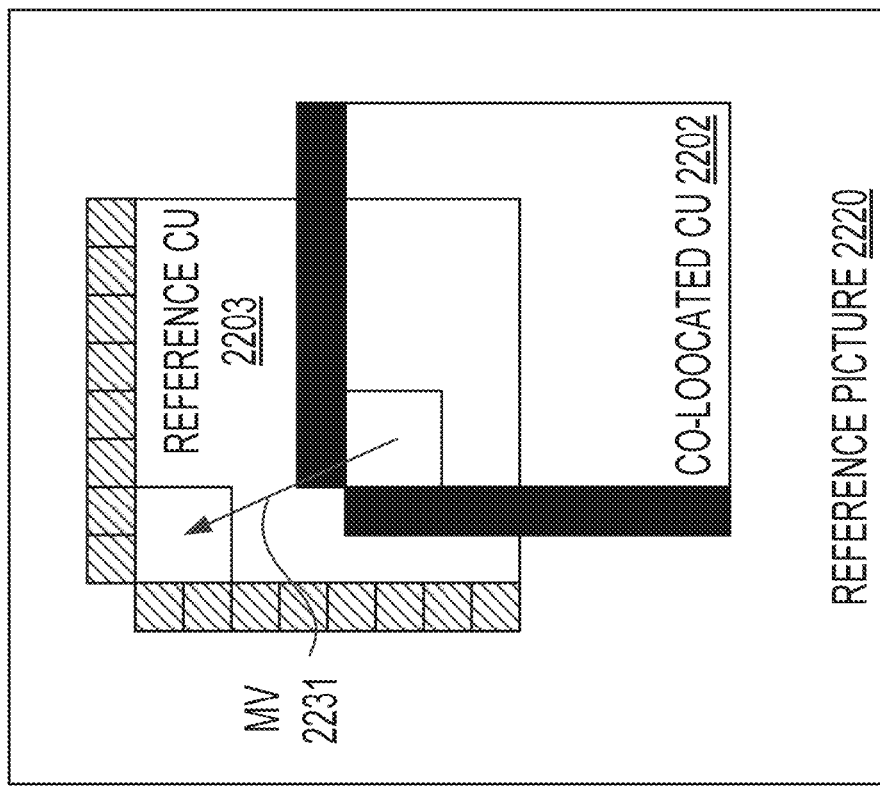
FIG. 22 shows an example of a first method for fetching reference samples.
Figure 22:
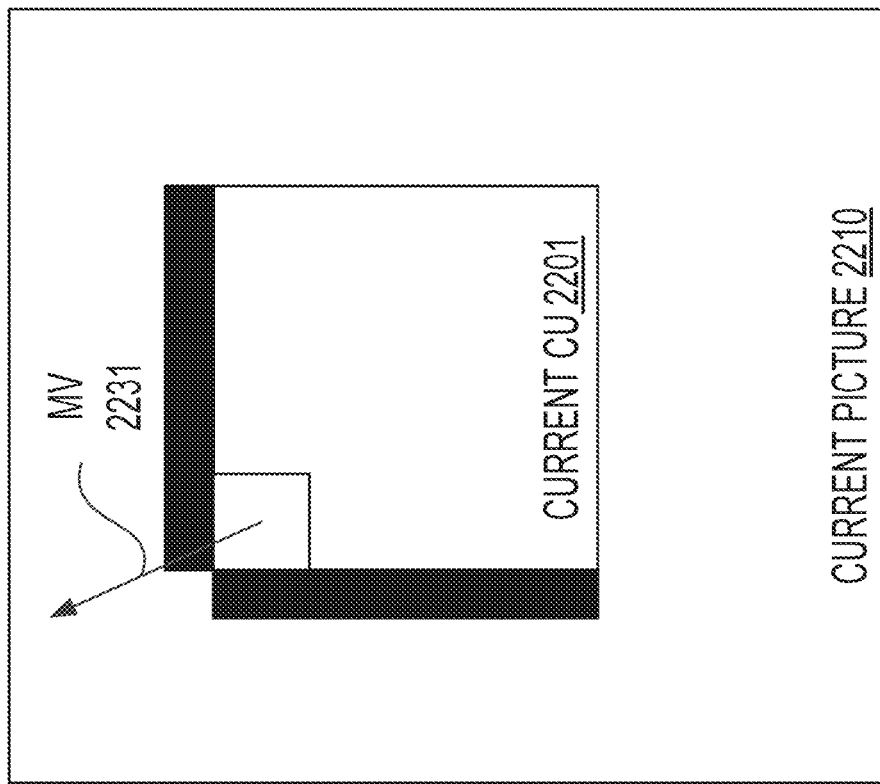

FIG. 22 shows an example of a first method for fetching reference samples. A current CU (2201) in a current picture (2210) can be an affine coded block. A co-located CU (2202) and a reference CU (2203) of the current CU (2201) are shown in a reference picture (2220). A top-left sub-block motion vector (MV) (2231) of the affine coded CU (2201) can be used for fetching the reference samples of the whole CU (2201).

Figure 23:
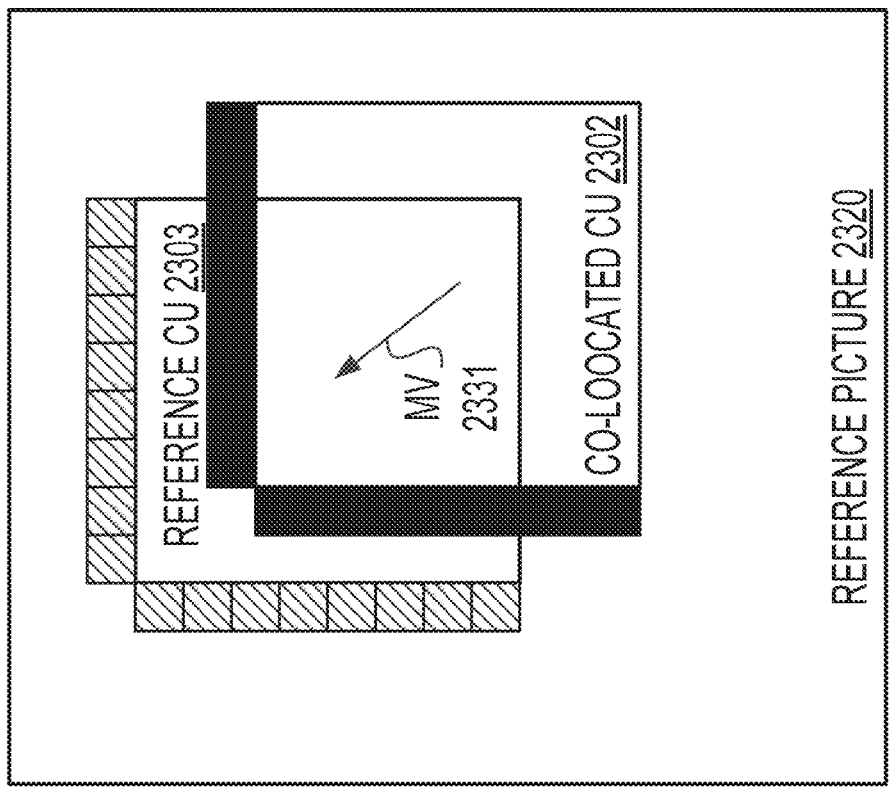
FIG. 23 shows an example of a second method for fetching reference samples.
Figure 23:
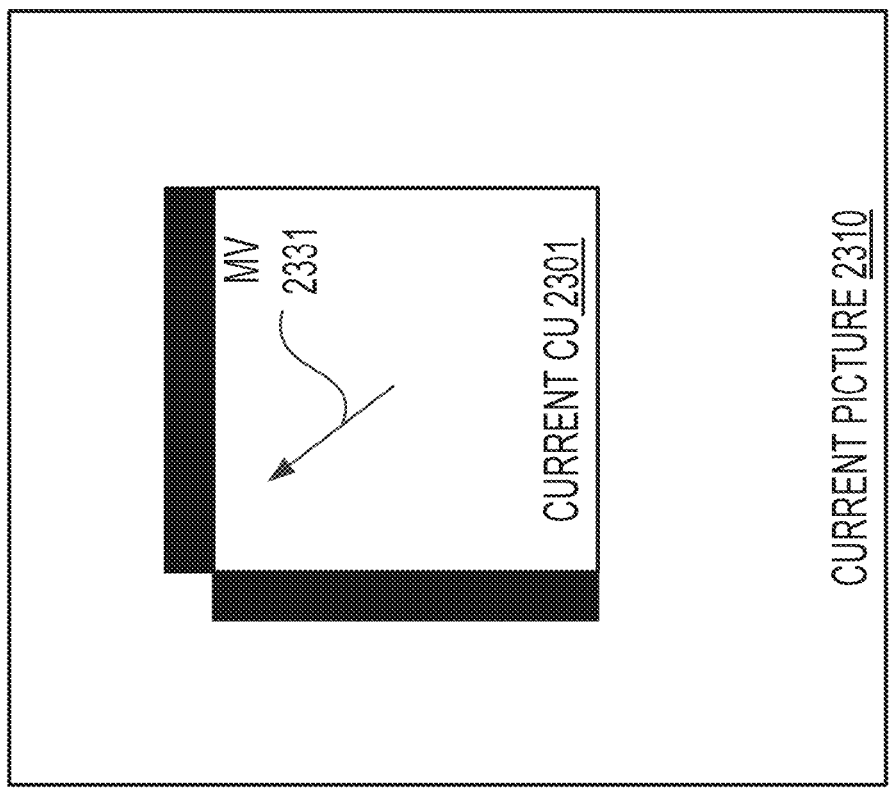

FIG. 23 shows an example of a second method for fetching reference samples. A current CU (2301) in a current picture (2310) can be an affine coded block. A co-located CU (2302) and a reference CU (2303) of the current CU (2301) are shown in a reference picture (2320). A central sub-block motion vector (MV) (2331) of the affine coded CU (2301) can be used for fetching the reference samples of the whole CU (2301).

Figure 24:
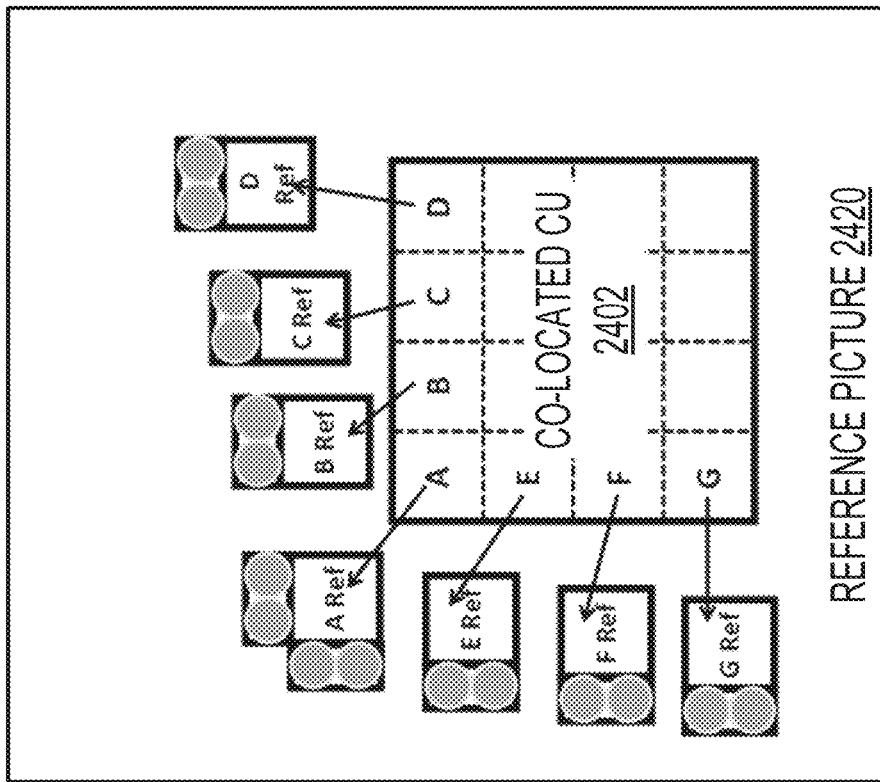
FIG. 24 shows an example of a third method where reference samples are fetched on a sub-block basis.
Figure 24:
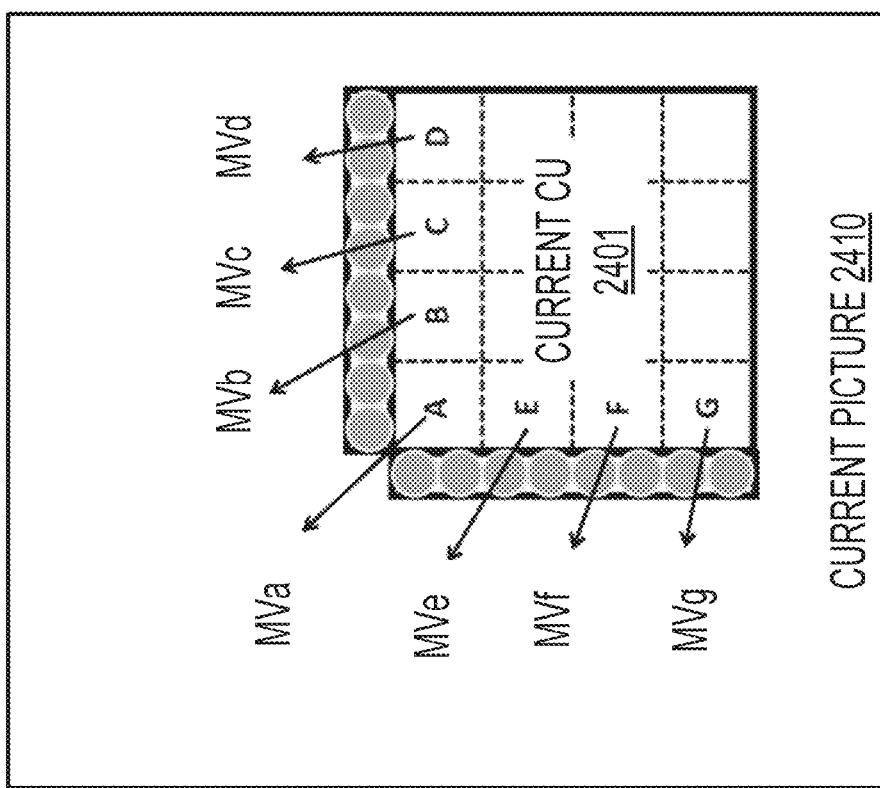

FIG. 24 shows an example of a third method where reference samples are fetched on a sub-block basis. A current CU (2401) in a current picture (2410) is an affine coded block. A co-located CU (2402) of the current CU (2401) is shown in a reference picture (2420). As shown, sub-block MVs in the left column and top row of the current CU (2401), from MVa to MVg, can be used to determine corresponding reference blocks from A Ref to G Ref in the reference picture (2420). Reference samples neighboring those reference blocks can be used for deriving the linear model parameters.

7. Predication Refinement Based on Bi-Directional Optical Flow (BDOF)

In some embodiments, a bi-directional optical flow (BDOF) tool is employed. Compared with another method (referred to as BIO) employed in the JEM, the BDOF is a simpler version that requires much less computation, especially in terms of number of multiplications and the size of the multiplier.

BDOF can be used to refine a bi-prediction signal of a CU at the 4×4 sub-block level. In an example, BDOF is applied to a CU if it satisfies the following conditions: (1) the CU's height is not 4, and the CU is not in size of 4×8; (2) the CU is not coded using affine mode or the ATMVP merge mode; (3) the CU is coded using "true" bi-prediction mode, i.e., one of the two reference pictures is prior to the current picture in display order and the other is after the current picture in display order. In an example, BDOF is only applied to luma component.

The BDOF mode is based on the optical flow concept, which assumes that the motion of an object is smooth. For each 4×4 sub-block, a motion refinement $(v_x, v_y)$ is calculated by minimizing the difference between the L0 and L1 prediction samples. The motion refinement is then used to adjust the bi-predicted sample values in the 4×4 sub-block. The following steps are applied in an example BDOF process.

First, the horizontal and vertical gradients, $$\frac{\partial I^{(k)}}{\partial x}(i,j) \text{ and } \frac{\partial I^{(k)}}{\partial y}(i,j), k=0,1,$$

of the two prediction signals are computed by directly calculating the difference between two neighboring samples, i.e., $$\frac{\partial I^{(k)}}{\partial x}(i,j) = (I^{(k)}(i+1,j) - I^{(k)}(i-1,j)) \gg shift1 \quad \text{(Eq. 13)}$$

$$\frac{\partial I^{(k)}}{\partial y}(i,j) = (I^{(k)}(i,j+1) - I^{(k)}(i,j-1)) \gg shift1$$

where $I^{(k)}(i,j)$ are the sample value at coordinate (i,j) of the prediction signal in list k, k=0,1, and shift is calculated based on the luma bit depth, bitDepth, as shift1=max(2, 14−bitDepth).

Then, the auto- and cross-correlation of the gradients, $S_1$, $S_2$, $S_3$, $S_5$ and $S_6$, are calculated as, $$s_1 = \Sigma_{(i,j) \in \Omega} \psi_x(i,j) \cdot \psi_x(i,j), s_3 = \Sigma_{(i,j) \in \Omega} \theta(i,j) \cdot \psi_x(i,j)$$

$$s_2 = \Sigma_{(i,j) \in \Omega} \theta_x(i,j) \cdot \psi_y(i,j)$$

$$s_5 = \Sigma_{(i,j) \in \Omega} \psi_y(i,j) \cdot \psi_y(i,j), s_6 = \Sigma_{(i,j) \in \Omega} \theta(i,j) \cdot \psi_y(i,j) \quad \text{(Eq. 14)}$$

where $$\psi_x(i,j) = \left(\frac{\partial I^{(1)}}{\partial x}(i,j) + \frac{\partial I^{(0)}}{\partial x}(i,j)\right) \gg n_a \quad \text{(Eq. 15)}$$

$$\psi_y(i,j) = \left(\frac{\partial I^{(1)}}{\partial y}(i,j) + \frac{\partial I^{(0)}}{\partial y}(i,j)\right) \gg n_a$$

$$\theta(i,j) = (I^{(1)}(i,j) \gg n_b) - (I^{(0)}(i,j) \gg n_b)$$

where $\Omega$ is a 6×6 window around the 4×4 sub-block, and the values of $n_a$ and $n_b$ are set equal to min(5, bitDepth−7) and min(8, bitDepth−4), respectively.

The motion refinement $(v_x, v_y)$ is then derived using the cross- and auto-correlation terms using the following:

$$v_x = S_1 > 0?\text{clip3}(-th'_{BIO}, th_{BIO}, -((S_3 \cdot 2^{nb-na}) \gg \lfloor \log_2 S_1 \rfloor)):0$$

$$v_y = S_5 > 0?\text{clip3}(-th'_{BIO}, th_{BIO}, -((S_6^{nb-na} - ((v_x S_{2,m}) \ll n_{s_2} + v_x v_{S_2})/2)(\gg \lfloor \log_2 S_5 \rfloor)):0 \quad \text{(Eq. 16)}$$

where $$S_{2,m} = S_2 \gg n_{S_2}, S_{2,s} = S_2 \& (2^{n_{S_2}} - 1), th'_{BIO} = 2^{13-BD}.$$

[·] is the floor function, and $n_{s_2}$=12.

Based on the motion refinement and the gradients, the following adjustment is calculated for each sample in the 4×4 sub-block:

$$b(x,y) = rnd\left(\left(v_x\left(\frac{\partial I^{(1)}(x,y)}{\partial x} - \frac{\partial I^{(0)}(x,y)}{\partial x}\right)\right)/2\right) + \quad \text{(Eq. 17)}$$

$$rnd\left(\left(v_y\left(\frac{\partial I^{(1)}(x,y)}{\partial y} - \frac{\partial I^{(0)}(x,y)}{\partial y}\right)\right)/2\right)$$

Finally, the BDOF samples of the CU are calculated by adjusting the bi-prediction samples as follows:

$$\text{pred}_{BDOF}(x,y) = (I^{(0)}(x,y) + I^{(1)}(x,y) + b(x,y) + o_{offset}) \gg shift \quad \text{(Eq.18)}$$

These values are selected such that the multipliers in the BDOF process do not exceed 15-bit, and the maximum bit-width of the intermediate parameters in the BDOF process is kept within 32-bit in an example.

Figure 25:
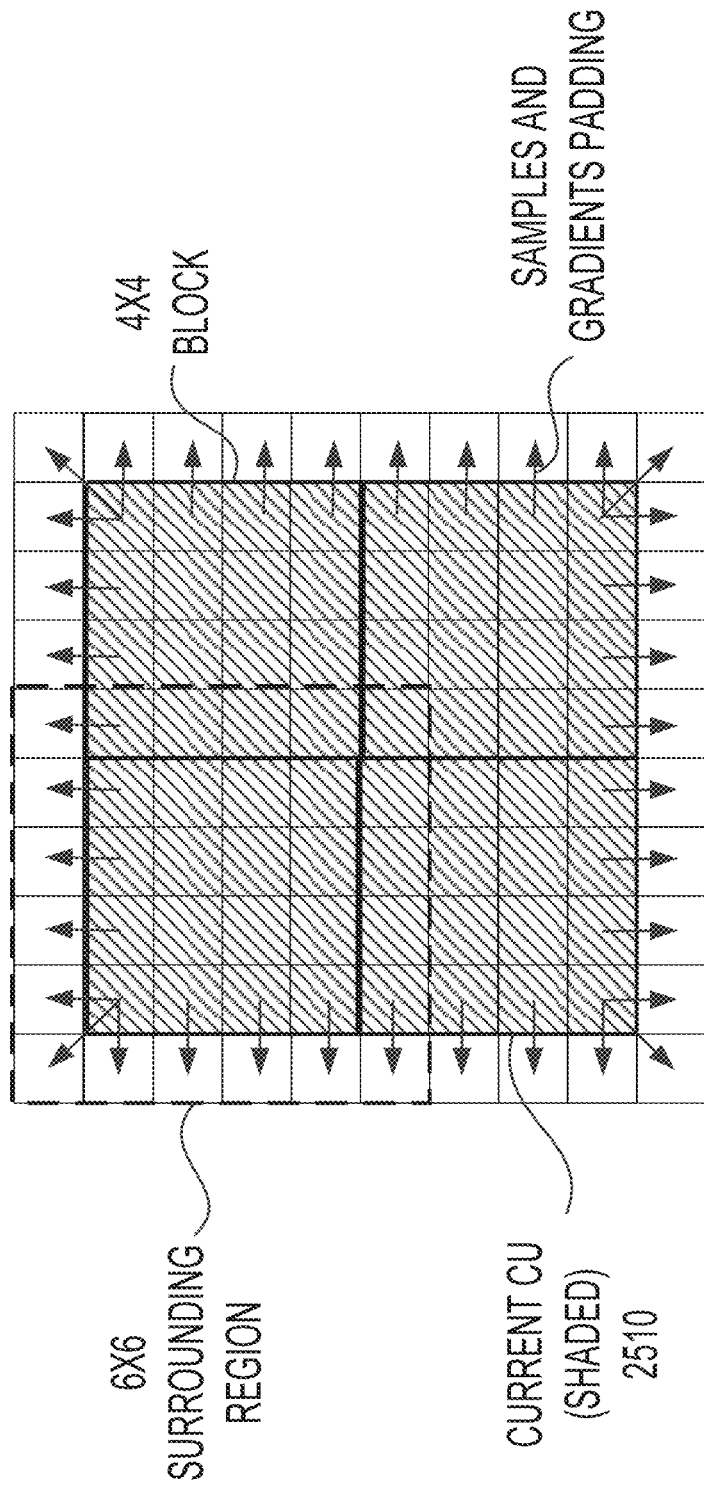
FIG. 25 shows an example of an extended coding unit (CU) region corresponding to a CU (2510) used in bi-directional optical flow (BDOF).

In some examples, in order to derive the gradient values, some prediction samples $I^{(k)}(i,j)$ in list k (k=0,1) outside of the current CU boundaries need to be generated. FIG. 25 shows an example of an extended CU region corresponding to a CU (2510) used in BDOF. As shown, the BDOF uses one extended row/column around a CU (2510)'s boundaries. In order to control the computational complexity of generating the out-of-boundary prediction samples, prediction samples in the extended area (un-shaded positions) are generated by taking the reference samples at the nearby integer positions (using floor( ) operation on the coordinates) directly without interpolation, and a normal 8-tap motion compensation interpolation filter is used to generate prediction samples within the CU (2510) (shaded positions). These extended sample values are used in gradient calculation only. For the remaining steps in the BDOF process, if any sample and gradient values outside of the CU boundaries are needed, they are padded (i.e. repeated) from their nearest neighbors.

III. PROF for Affine Prediction

1. Conditional Application of PROF for Affine Prediction

In some embodiments, the PROF for affine prediction can always be enabled, which can increase complexity for an encoder or decoder. In contrast, in some other embodiments, the PROF for affine can be conditionally enabled or disabled to improve performance and to reduce complexity at an encoder or a decoder. For example, the PROF can be conditionally applied to an affine coded block based on affine parameter values.

As described, affine parameters may be calculated using CPMVs in the following way. Let x and y be the horizontal and vertical offsets from a pixel location to the center of a sub-block in a current CU, an adjustment MV $\Delta v(x,y)$ can be derived by the following equations, $$\begin{cases} \Delta v_x(x, y) = a*x + b*y \\ \Delta v_y(x, y) = c*x + d*y \end{cases} \quad \text{(Eq. 19)}$$

For 4-parameter affine model, $$\begin{cases} a = d = \dfrac{v_{1x} - v_{0x}}{w} \\ c = -b = \dfrac{v_{1y} - v_{0y}}{w} \end{cases} \quad \text{(Eq. 20)}$$

For 6-parameter affine model, $$\begin{cases} a = \dfrac{v_{1x} - v_{0x}}{w} \\ b = \dfrac{v_{2x} - v_{0x}}{h} \\ c = \dfrac{v_{1y} - v_{0y}}{w} \\ d = \dfrac{v_{2y} - v_{0y}}{h} \end{cases} \quad \text{(Eq. 21)}$$

where $(v_{0x}, v_{0y})$, $(v_{1x}, v_{1y})$, $(v_{2x}, v_{2y})$ are the top-left, top-right and bottom-left control point motion vectors of the current CU, and w and h are the width and height of the current CU.

In one embodiment, for an affine coded block, when the maximum absolute values of affine parameter a, b, c, or d, denoted as max_parameter=max{|a|, |b|, |c|, |d|}, is above or equal to a predefined threshold value, the PROF for affine is not applied for the affine coded block. Otherwise, if the max_parameter is below the threshold value, the PROF can be applied to the affine coded block.

In another embodiment, for an affine coded block, when the minimum absolute values of affine parameter a, b, c, or d, denoted as min_parameter=min{|a|, |b|, |c|, |d|}, is below or equal to a predefined threshold value, the PROF for affine is not applied for the affine coded block. Otherwise, if the min_parameter is above the threshold value, the PROF can be applied to the affine coded block.

In another embodiment, for an affine coded block, when the absolute values of affine parameter a, b, c, or d, are in a predefined value range, the PROF for affine can be applied for the affine coded block. Otherwise, if any absolute value of the affine parameters is not in the predefined range, the PROF is not applied to the affine coded block. The value range may be denoted as [M, N], where M and N are positive numbers. In one example, M and N are predefined, or signaled in bitstream, for example, in a sequence parameter set (SPS), a picture parameter set (PPS), a tile group header, a tile header, a slice header, or the like.

In another embodiment, for an affine coded block, the usage (enable or disable) of the PROF may be determined by a flag, for example, denoted by prof_flag. The flag can be signaled at a bock level. Accordingly, the PROF can be enabled when the value of the flag is true.

In another embodiment, a syntax element may be used to determine whether the PROF for affine prediction is enabled or not. The syntax element can be a high level syntax element in an example. For example, the syntax element may be signaled at a sequence level, a slice level, a tile level, a tile group level, a picture level, or the like.

2. Gradient Calculation for PROF

In some embodiments, in a PROF process, gradient calculation can be performed in a sub-block basis. For example, inter prediction (including interpolation operations during the inter prediction) can be performed for each affine sub-block (for example, for each 4×4 sub-block for affine prediction). The gradient is then calculated with a 3-tap filter [10-1] based on the prediction output of the affine sub-block. Refinement is also applied on the sub-block subsequently. To calculate the gradient for each affine sub-block, the affine sub-block can be padded to a larger size, for example, extending 1 pixel on each side.

2.1 Gradient Calculation for an Entire Block

In one embodiment, the gradient calculation in PROF may be performed for the entire coding block when the inter prediction (interpolation) for all affine sub-blocks are completed. In such a way, extending each sub-block for the gradient calculation can be avoided. Instead, the whole coding block can be extended (padded) for 1 pixel, for example, on each side for the gradient calculation, which is less complex than extending each sub-block. The refinement may be done for each sub-block based on the gradient of the respective sub-block obtained from the whole-block based calculation.

For the padding for the whole block, the following methods may be used in various embodiments: (1) The pixels on the extended borders are generated by interpolation using the corresponding sub-block's motion vector. (2) The pixels on the extended borders are copied from the nearest integer pixel position in the reference picture. (3) The pixels on the extended borders are copied from the closet samples of the current block's inter prediction output.

2.2 Generating Gradient Filter from Interpolation Filter

In some embodiments, an interpolation filter for affine prediction and a gradient filter for PROF gradient calculation can be combined to generate a combined gradient filter. The combined gradient filter can be used directly over samples in a reference picture of a current coding block to generate respective PROF gradients. In such a way, a gradient calculation process can be performed in parallel with a corresponding interpolation process to accelerate the PROF processing.

In one embodiment, a 10-tap gradient filter may be generated by a convolution of a 3-tap PROF gradient filter (e.g., with taps of [10-1]) and an 8-tap interpolation filter used for inter prediction. Accordingly, the gradient calculation may be performed using this generated 10-tap gradient filter on the reference samples directly.

In another embodiment, a 10-tap gradient filter may be generated by a convolution of a 3-tap PROF gradient filter and an 8-tap interpolation filter used for inter prediction, and then truncated to an 8-tap filter by removing one coefficients from each side. Accordingly, the gradient calculation may be performed using this generated 8-tap gradient filter on the reference samples directly.

In another embodiment, an 8-tap gradient filter may be generated by a convolution of a 3-tap PROF gradient filter and the 6-tap interpolation filter used for inter prediction. Accordingly, the gradient calculation may be performed using this generated 8-tap gradient filter on the reference samples directly.

In another embodiment, an N-tap gradient filter may be generated by a convolution of a M-tap PROF gradient filter and an L-tap interpolation filter for inter prediction, and then truncated to an N tap filter, where N is smaller than or equal to M+L. Accordingly, the gradient calculation may be performed using this generated N-tap gradient filter on the reference samples directly.

IV. Interaction Between PROF and LIC

1. LIC Flag Based Conditional Application of PROF for Affine Prediction

When both PROF and LIC are applied for an affine coded CU, refinement performance of the affine coded CU may not be further improved compared with applying one of PROF or LIC, or even become worse. Accordingly, in some embodiments, when the PROF for affine prediction is enabled, whether the PROF can be applied can be determined with consideration of whether LIC is enabled or disabled. The PROF for affine prediction can be enabled by default or by a high level syntax, for example, signaled at a sequence level (e.g., SPS), a picture level (e.g., PPS), a slice level, a tile level, a tile group level, a CTU level, and the like.

In one embodiment, when LIC is signaled to be disabled at a given high level, such as a sequence level (e.g., SPS), a picture level (e.g., PPS), a slice level, a tile/tile group level, and the like, the PROF can be enabled for affine coded blocks.

In another embodiment, the PROF may be enabled for affine coded blocks, regardless of whether LIC is applied or not. In one example, sample adjustment in LIC is applied before PROF. In another example, sample adjustment in LIC is applied after PROF.

In another embodiment, when an LIC tool is enabled by default or to be signaled as enabled at a high level, such as a sequence level (e.g., SPS), a picture level (e.g., PPS), a slice level, a tile/tile group level, and the like, and some blocks have LIC flags signaled indicating whether LIC is applied for the respective blocks. In such a scenario, in an example, if LIC is signaled as enabled at a block level for a block with affine inter prediction, PROF is inferred as disabled for that block. Otherwise, if LIC is disabled for an affine coded block, PROF is inferred as enabled for the block.

2. LIC Flag Inheritance in Affine Merge

When a current block is coded in affine merge mode, an LIC flag value corresponding to the current block can be determined in various ways.

In one embodiment, inherited affine merge is used for the current block. Accordingly, the current block's LIC flag can be inherited from an LIC flag of the block used as a source of affine model inheritance.

In another embodiment, constructed affine merge is used for a current block. An LIC flag can be inherited from a first available source candidate of neighboring blocks used for constructing the current block's affine control point motion vectors $CPMV_k$ (k=1, 2, 3, 4). In an example, when the current block uses a constructed affine model with 3 control points motion vectors as described in the FIG. 16 example, and the combination of CPMVs is (CPMV1, CPMV2, CPMV3). The neighboring block used to construct CPMV1 may be used as the source of the LIC flag inheritance. In another example, when the current block uses a constructed affine model with 2 control points motion vectors as described in the FIG. 16, and the combination of CPMVs is (CPMV1, CPMV3). The neighboring block used to construct CPMV1 may be used as the source of the LIC flag inheritance.

In another embodiment, constructed affine merge is used for a current block. If at least 2 source candidates used for constructed affine CPMVs have the same LIC flag value, this LIC flag value may be applied to the current block. Otherwise, if only 2 control points are used for the constructed affine merge, and their LIC flags are different, then LIC can be set to be disabled for the current block.

In another embodiment, for an affine merge mode, a current block's LIC flag can be inferred to be disabled (e.g., having a value of 0).

In another embodiment, a current block's LIC flag can be inherited from a neighboring block's LIC flag when inherited affine merge is used. Otherwise, when the selected merge candidate is not an inherited affine merge candidate, the current block's LIC flag can be inferred to be disabled.

V. PROF Alike Refinement for Blocks with High Precision Intermediate Motion Vectors In TMVP mode or sub-block based TMVP (SbTMVP) mode, a scaling operation can be performed on a temporally predicted MV to generate an intermediate MV. The intermediate MV can have a higher precision than a precision (e.g., 1/16-sample) supported by an interpolation filter used for generation of a prediction block. The intermediate MV can be clipped or rounded to generate a final MV predictor having the supported precision. Accordingly, the final MV predictor can lose accuracy due to the rounding operation compared with the intermediate MV.

In some embodiments, the intermediate high precision MV is used as the final MV predictor for TMVP or SbTMVP in order to improve coding efficiency, however, at a cost of more phases of interpolation operations and potentially additional memory requirement for storing the high precision MV.

To solve the problem, in some embodiments, a PROF alike refinement can be used for blocks having intermediate MVs (denoted by $MV_{block}$) with a high precision compared with a precision supported by an existing interpolation filter. Examples of coding modes for which the PROF alike refinement can be applied can include TMVP, SbTMVP, spatial MV prediction, MMVD, AMVP, or the like. In those coding modes, a scaling operation may be performed for generation of a MV predictor, or a candidate MV with a higher precision is used as a MV predictor. High precision intermediate MVs in those coding modes can be rounded to a supported precision of an interpolation filter, and subsequently used in motion compensation to generate a prediction block. A difference between a high precision intermediate MV and a supported precision MV for interpolation can be exploited to refine a prediction block resulting from the motion compensation.

In an example, the PROFP alike refinement process can include the following steps:

Step1: Forming a prediction block Pred with $MV_{round}$ which represents a MV rounded to the highest precision supported by an existing interpolation filter.

Step2: Calculating a PROF alike prediction refinement offset $\Delta I(i,j)$ per sample location for the current block. One example of $\Delta I(i,j)$ is derived with the following formula:

$$\Delta I(i,j) = g_x(i,j) * \Delta v_x + g_y(i,j) * \Delta v_y \quad (Eq.\ 22)$$

where $g_x(i,j)$ and $g_y(i,j)$ are gradients of the prediction Pred at location (i,j) along x and y directions, respectively, and $\Delta v_x$ and $\Delta v_y$ are MV differences between $MV_{block}$ and $MV_{round}$.

Step3: Adding $\Delta I(i,j)$ to inter prediction Pred and, in some examples, clipping the resulting pixels to target range if necessary.

In an embodiment, when the current block has the same MV for the whole block (e.g., sub-blocks having the same MV), the above PROC alike refinement process is applied to the whole block. When the current block has different motion vectors at sub-block level, such as blocks coded with SbTMVP, the above PROC alike refinement process is applied for each individual sub-block.

In an embodiment, the precision of $MV_{block}$ may be predefined or signaled in a bitstream, such as in a sequence parameter set (e.g., SPS), a picture parameter set (e.g., PPS), a slice header, a tile group header, or the like. Alternatively, when BDOF is used, the same precision as the one used for the BDOF can be used. For example, 1/32 sample, 1/24 sample, or 1/64 sample may be predefined for $MV_{block}$.

In some embodiments, the gradients of prediction Pred may be calculated with a 3-tap filter [−1, 0, 1] as follows:

$$g_x(i,j)=I(i+1,j)-I(i-1,j)$$

$$g_y(i,j)=I(i,j+1)-I(i,j-1), \quad \text{(Eq. 23)}$$

where I(i,j) indicates the block prediction Pred at location (i,j).

Figure 26:
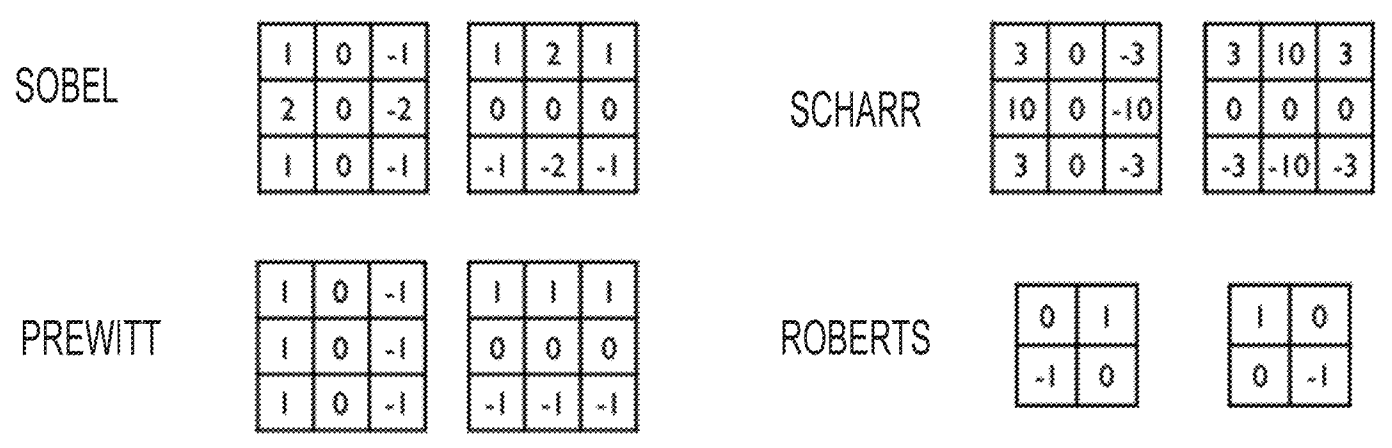

For calculation of the gradients, in one embodiment, to reduce the memory bandwidth and complexity, the pixels on the extended borders may be copied from the nearest integer pixel position in the reference picture. Therefore, additional interpolation for the padding region is avoided. In another embodiment, the extended prediction samples may be generated by additional interpolation from the corresponding reference samples. In one embodiment, the precision of gradient is based on the bit-depth of source video. In another embodiment, Sobel filter may be used to calculate the gradients for x and y directions. In another embodiment, Scharr filter may be used to calculate the gradients for x and y directions. In another embodiment, Prewitt filter may be used to calculate the gradients for x and y directions. In another embodiment, Roberts filter may be used to calculate the gradients for x and y directions. FIG. 26 shows examples of kernels of the Sobel, Scharr, Prewitt and Roberts filters.

In an embodiment, when storing MVs for a current picture, the MVs with a higher precision (higher than the highest precision supported by interpolation filter) may be stored and may be used in spatial MV prediction. In an embodiment, when storing MVs of the current picture into a frame buffer (to be used as TMVP for other pictures), the MVs with the higher precision may be rounded to the highest precision supported by the interpolation filter before MV compression.

In some embodiments, the PROF alike refinement process may not be used together with some coding modes, such as BDOF, DMVR, triangle merge, intra-inter mode, or the like.

VI. Examples of PROF or PROF Alike Refinement Processes

1. Example PROF Process

Figure 27:
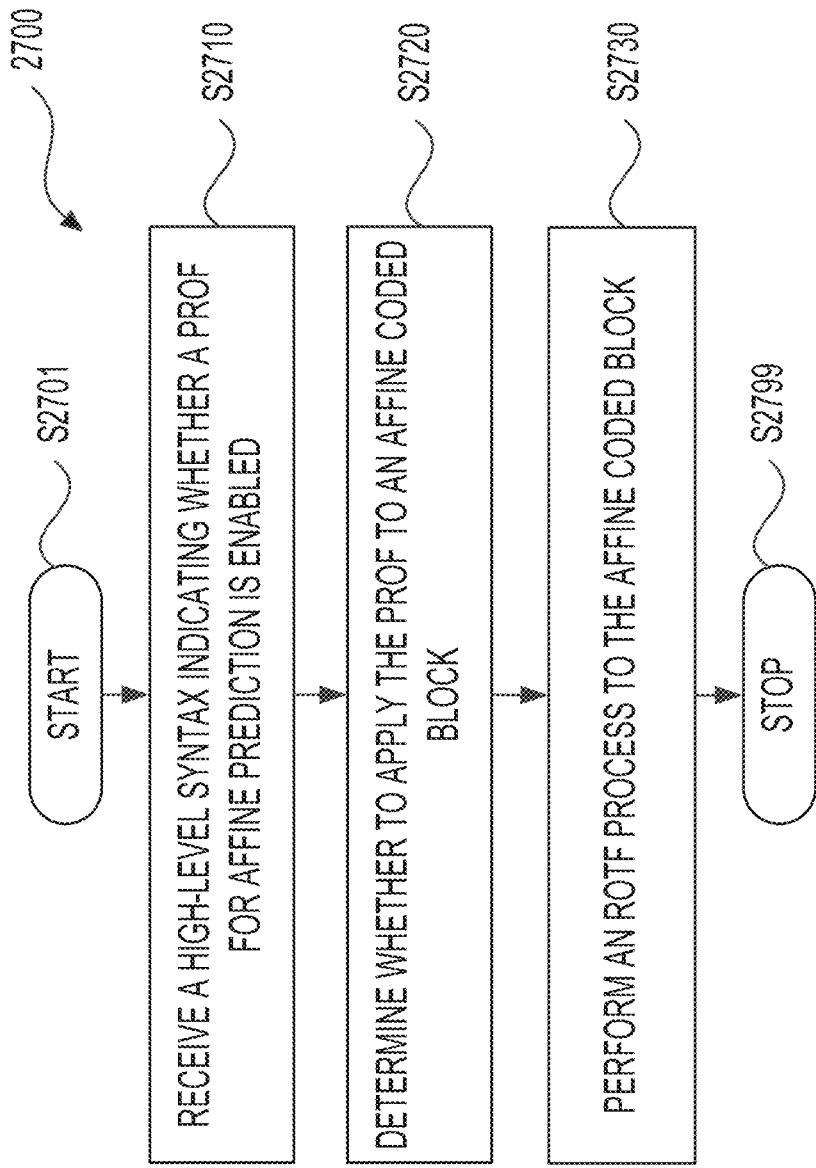
FIG. 27 shows a flowchart outlining a process (2700) according to an embodiment of the disclosure.

FIG. 27 shows a flowchart outlining a process (2700) according to an embodiment of the disclosure. The process (2700) can be used in the reconstruction of a block coded in an affine prediction mode (e.g., affine merge mode, affine AMVP, and the like), so to generate a prediction block for the block under reconstruction. In various embodiments, the process (2700) are executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (2700) is implemented in software instructions, thus when the processing circuitry executes the software instructions, the processing circuitry performs the process (2700). The process starts at (S2701) and proceeds to (S2710).

At S2710, a syntax element indicating whether a PROF for affine prediction is enabled. In an example, the syntax element is signaled at a sequence level, a slice level, a tile level, a tile group level, a picture level, or the like. In another example, the PROF for affine prediction can be enabled by default without signaling of the syntax element.

At S2720, it is determined whether to apply the PROF to an affine coded block. In an examples, whether to apply the PROF to the affine coded block is determined based on values of affine parameters of an affine model of the affine coded block. In an example, whether to apply the PROF to the affine coded block is determined based on the received syntax element indicating whether the PROF for affine prediction is enabled, and a signaling indicating whether LIC is enabled.

At S2730, a PROF process is performed when it is determined to apply the PROF to the affine coded block. In an example, the PROF process can include generating a prediction sample I(i,j) at a sample location (i,j) in the affine coded block, generating spatial gradients $g_x(i,j)$ and $g_y(i,j)$ at the sample location (i,j) in the affine coded block, generating a prediction refinement $\Delta I(i,j)$ based on the spatial gradients $g_x(i,j)$ and $g_y(i,j)$, and adding the prediction refinement $\Delta I(i,j)$ to the prediction sample I(i,j) to generate a refined prediction sample.

In an example, the spatial gradients $g_x(i,j)$ and $g_y(i,j)$ at the sample location (i,j) are generated based on a first prediction sample(s) of a first sub-block including the prediction sample I(i,j) and a second prediction sample(s) of a second sub-block neighboring the first sub-block. The first sub-block and the second sub-block can be sub-blocks partitioned from the affine coded block.

In an example, the spatial gradients $g_x(i,j)$ and $g_y(i,j)$ at the sample location (i,j) are generated using a generated gradient filter on reference samples in a reference picture of the affine coded block. For example, the generated gradient filter can be generated by a convolution of a first gradient filter and an interpolation filter. For example, assuming the generated gradient filter is not used, the interpolation filter can be applied on the reference samples in the reference picture of the affine coded block to generate prediction samples of the affine coded block. Subsequently, the first gradient filter can be applied on the generated prediction samples of the affine coded block to generate the spatial gradients $g_x(i,j)$ and $g_y(i,j)$. Employment of the generated gradient filter enables parallel processing between the interpolation (or prediction) of the affine coded block and the generation of the spatial gradients $g_x(i,j)$ and $g_y(i,j)$.

In an example, the affine coded block is coded in an affine merge mode, and an LIC flag value of the affine coded block can be inherited from a neighboring block of the affine coded block that is used as a source for affine model inheritance or affine model construction of the affine coded block. The process 2700 can proceed to S2799, and terminate at S2799.

2. Example PROF Alike Refinement Process

Figure 28:
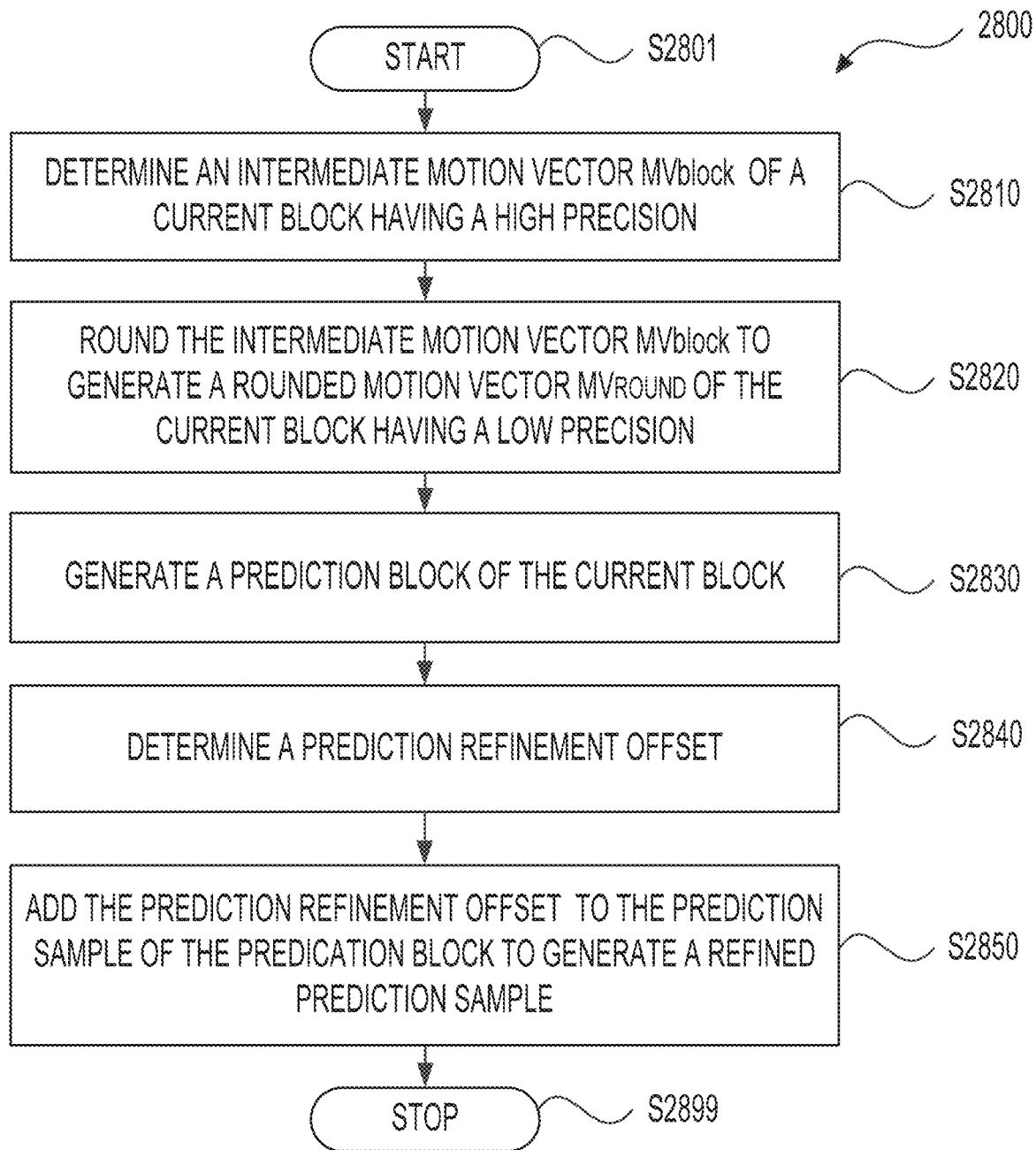
FIG. 28 shows another flowchart outlining a process (2800) according to an embodiment of the disclosure.

FIG. 28 shows a flowchart outlining a process (2800) according to an embodiment of the disclosure. The process (2800) can be used in the reconstruction of a block having an intermediate MV with a higher precision than a precision supported by an interpolation filter used in a motion compensation for generating a prediction of the block. In various embodiments, the process (2800) are executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (2800) is implemented in software instructions, thus when the processing circuitry executes the software instructions, the processing circuitry performs the process (2800). The process starts at (S2801) and proceeds to (S2810).

At S2810, an intermediate motion vector $MV_{block}$ of a current block can be determined. The intermediate motion vector $MV_{block}$ can have a high precision compared with a low precision supported by an interpolation filter of the current block. The current block can be a block or a sub-block coded with TMVP, SbTMVP, MMVD, affine AMVP, a spatial motion vector prediction mode, or the like. Accordingly, the intermediate motion vector $MV_{block}$ an be generated in a motion vector scaling operation. Alternatively, the current block can be coded using a motion vector predictor with the high precision.

In an example, a syntax element indicating the high precision can be received in a sequence parameter set (SPS), picture parameter set (PPS), a slice header, a tile group header, or the like. The intermediate motion vector $MV_{block}$, when generated originally, may have a precision higher than the signaled high precision, and be rounded to the signaled high precision.

At S2820, the intermediate motion vector $MV_{block}$ is rounded to generate a rounded motion vector $MV_{round}$ of the current block having the low precision supported by the interpolation filter of the current block.

At S2830, a prediction block of the current block can be generated based on the rounded motion vector $MV_{round}$ and the interpolation filter.

At S2840, a prediction refinement offset $\Delta I(i,j)$ can be determined according to, $$\Delta I(i,j)=g_x(i,j)*\Delta v_x+g_y(i,j)*\Delta v_y, \qquad \text{(Eq. 24)}$$

where $g_x(i,j)$ and $g_y(i,j)$ are gradients of a prediction sample of the prediction block at a location (i,j) along x and y directions, respectively, and $\Delta v_x$ and $\Delta v_y$ are motion vector differences between the intermediate motion vector $MV_{block}$ and the rounded motion vector $MV_{round}$ along x and y directions, respectively.

At S2850, the prediction refinement offset $\Delta I(i,j)$ is added to the prediction sample of the predication block to generate a refined prediction sample. In an example, the intermediate motion vector $MV_{block}$ having a high precision is stored in a memory. Another block in a current picture including the current block can be coded using the intermediate motion vector $MV_{block}$ for spatial motion vector prediction. The process 2800 can proceed to S2899, and terminates at S2899.

VII. Computer System

The techniques described above, can be implemented as computer software using computer-readable instructions and physically stored in one or more computer-readable media. For example, FIG. 29 shows a computer system (2900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 29:
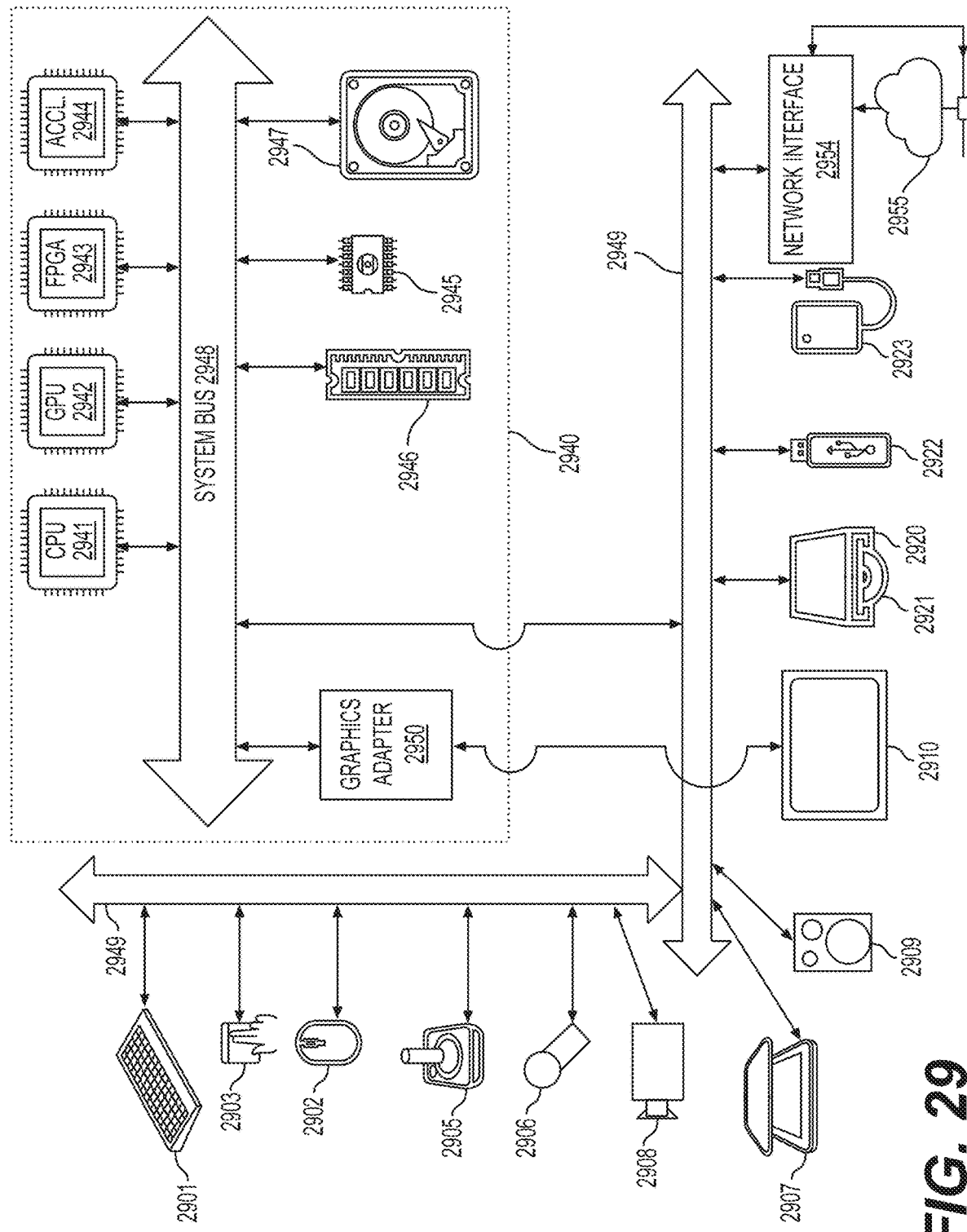
FIG. 29 is a schematic illustration of a computer system in accordance with an embodiment.

The components shown in FIG. 29 for computer system (2900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2900).

Computer system (2900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2901), mouse (2902), trackpad (2903), touch screen (2910), data-glove (not shown), joystick (2905), microphone (2906), scanner (2907), camera (2908).

Computer system (2900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2910), data-glove (not shown), or joystick (2905), but there can also be tactile feedback devices that do not serve as input devices), audio output devices (such as: speakers (2909), headphones (not depicted)), visual output devices (such as screens (2910) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (2900) can also include human accessible storage devices and their associated media such as optical media including CD/DVD ROM/RW (2920) with CD/DVD or the like media (2921), thumb-drive (2922), removable hard drive or solid state drive (2923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2900) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2949) (such as, for example USB ports of the computer system (2900)); others are commonly integrated into the core of the computer system (2900) by attachment to a system bus as described below (for example Ethernet interface into a PC computer system or cellular network interface into a smartphone computer system). Using any of these networks, computer system (2900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2940) of the computer system (2900).

The core (2940) can include one or more Central Processing Units (CPU) (2941), Graphics Processing Units (GPU) (2942), specialized programmable processing units in the form of Field Programmable Gate Areas (FPGA) (2943), hardware accelerators for certain tasks (2944), and so forth. These devices, along with Read-only memory (ROM) (2945), Random-access memory (2946), internal mass storage such as internal non-user accessible hard drives, SSDs, and the like (2947), may be connected through a system bus (2948). In some computer systems, the system bus (2948) can be accessible in the form of one or more physical plugs to enable extensions by additional CPUs, GPU, and the like. The peripheral devices can be attached either directly to the core's system bus (2948), or through a peripheral bus (2949). Architectures for a peripheral bus include PCI, USB, and the like.

CPUs (2941), GPUs (2942), FPGAs (2943), and accelerators (2944) can execute certain instructions that, in combination, can make up the aforementioned computer code. That computer code can be stored in ROM (2945) or RAM (2946). Transitional data can be also be stored in RAM (2946), whereas permanent data can be stored for example, in the internal mass storage (2947). Fast storage and retrieve to any of the memory devices can be enabled through the use of cache memory, that can be closely associated with one or more CPU (2941), GPU (2942), mass storage (2947), ROM (2945), RAM (2946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2900), and specifically the core (2940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2940) that are of non-transitory nature, such as core-internal mass storage (2947) or ROM (2945). The software implementing various embodiments of the present disclosure can be stored in such devices and executed by core (2940). A computer-readable medium can include one or more memory devices or chips, according to particular needs. The software can cause the core (2940) and specifically the processors therein (including CPU, GPU, FPGA, and the like) to execute particular processes or particular parts of particular processes described herein, including defining data structures stored in RAM (2946) and modifying such data structures according to the processes defined by the software. In addition or as an alternative, the computer system can provide functionality as a result of logic hardwired or otherwise embodied in a circuit (for example: accelerator (2944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

AMVP: Advanced MVP
ASIC: Application-Specific Integrated Circuit
BDOF: Bi-Directional Optical Flow
BMS: benchmark set
CANBus: Controller Area Network Bus
CD: Compact Disc
CPUs: Central Processing Units
CRT: Cathode Ray Tube
CTBs: Coding Tree Blocks
CTUs: Coding Tree Units
CU: Coding Unit
DVD: Digital Video Disc
FPGA: Field Programmable Gate Areas
GOPs: Groups of Pictures
GPUs: Graphics Processing Units
GSM: Global System for Mobile communications
HEVC: High Efficiency Video Coding
HMVP: History-based MVP
HRD: Hypothetical Reference Decoder
IC: Integrated Circuit
JEM: joint exploration model
LAN: Local Area Network
LCD: Liquid-Crystal Display
LIC: Local illumination compensation
LTE: Long-Term Evolution
MMVD: Merge with MVD
MV: Motion vector
MVD: Motion vector difference
MVP: Motion vector predictor
OLED: Organic Light-Emitting Diode
PBs: Prediction Blocks
PCI: Peripheral Component Interconnect
PLD: Programmable Logic Device
PROF: Prediction refinement with optical flow
PUs: Prediction Units
RAM: Random Access Memory
ROM: Read-Only Memory
SbTMVP: Sub-block-based TMVP
SEI: Supplementary Enhancement Information
SNR: Signal Noise Ratio
SSD: solid-state drive
TMVP: Temporal MVP
TUs: Transform Units,
USB: Universal Serial Bus
VTM: Versatile test model
VUI: Video Usability Information
VVC: Versatile video coding While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video coding by a video decoder, comprising:
    receiving a picture level syntax element indicating whether a prediction refinement with optical flow (PROF) for affine prediction is disabled for a current picture;
    determining whether to apply the PROF for affine prediction to an affine coded block in the current picture based on the picture level syntax element indicating whether the PROF for affine prediction is disabled for the current picture,
    wherein responsive to the picture level syntax element indicating the PROF for affine prediction is disabled for the current picture, the PROF for affine prediction is not applied to the affine coded block in the current picture; and
    responsive to the PROF for affine prediction being determined as applied to the affine coded block:
        generating spatial gradients $g_x(i,j)$ and $g_y(i,j)$ at a sample location (i,j) in the affine coded block in a prediction sample I(i,j);
        generating a prediction refinement $\Delta I(i,j)$ based on the spatial gradients $g_x(i,j)$ and $g_y(i,j)$; and
        adding the prediction refinement $\Delta I(i,j)$ to the prediction sample I(i,j) a to generate a refined prediction sample.

2. The method of claim 1, wherein responsive to the picture level syntax element indicating the PROF for affine prediction is not disabled for the current picture, the PROF for affine prediction is applied to the affine coded block.

3. The method of claim 1, wherein the PROF for affine prediction is enabled by default.

4. The method of claim 1, wherein the determining whether to apply the PROF for affine prediction to the affine coded block includes:
    determining whether to apply the PROF for affine prediction to the affine coded block based on values of affine parameters of an affine model of the affine coded block.

5. The method of claim 1, wherein the generating the spatial gradients $g_x(i,j)$ and $g_y(i,j)$ at the sample location (i,j) includes:
    generating the spatial gradients $g_x(i,j)$ and $g_y(i,j)$ at the sample location (i,j) based on a first prediction sample(s) of a first sub-block including the prediction sample I(i,j) and a second prediction sample(s) of a second sub-block neighboring the first sub-block, the first sub-block and the second sub-block being partitioned from the affine coded block.

6. The method of claim 1, wherein the generating the spatial gradients $g_x(i,j)$ and $g_y(i,j)$ at the sample location (i,j) includes:
    performing inter prediction for sub-blocks of the affine coded block; and
    generating spatial gradients at sample locations on a basis of prediction samples of the entire affine coded block.

7. The method of claim 1, wherein the generating the spatial gradients $g_x(i,j)$ and $g_y(i,j)$ at the sample location (i,j) includes:
    generating the spatial gradients $g_x(i,j)$ and $g_y(i,j)$ at the sample location (i,j) using a generated gradient filter on reference samples in a reference picture of the affine coded block.

8. The method of claim 7, wherein the generated gradient filter is generated by a convolution of a first gradient filter and an interpolation filter,
    wherein application of the interpolation filter on the reference samples in the reference picture of the affine coded block generates prediction samples of the affine coded block, and subsequent application of the first gradient filter on the generated prediction samples of the affine coded block generates the spatial gradients $g_x(i,j)$ and $g_y(i,j)$.

9. The method of claim 1, wherein the determining whether to apply the PROF for affine prediction to the affine coded block includes:
    determining whether to apply the PROF for affine prediction to the affine coded block based on the received picture level syntax element indicating whether the PROF for affine prediction is disabled, and a signaling indicating whether a local illumination compensation (LIC) is enabled.

10. The method of claim 1, wherein the affine coded block is coded in an affine merge mode, and an LIC flag value of the affine coded block is inherited from a neighboring block of the affine coded block that is used as a source for affine model inheritance or affine model construction of the affine coded block.

11. An apparatus, comprising circuitry configured to:
    receive a picture level syntax element indicating whether a prediction refinement with optical flow (PROF) for affine prediction is disabled for a current picture;
    determine whether to apply the PROF for affine prediction to an affine coded block in the current picture based on the picture level syntax element indicating whether the PROF for affine prediction is disabled for the current picture,
    wherein responsive to the picture level syntax element indicating the PROF for affine prediction is disabled for the current picture, disable the PROF for affine prediction is not applied to the affine coded block in the current picture; and
    responsive to the PROF for affine prediction being determined as applied to the affine coded block:
        generate spatial gradients $g_x(i,j)$ and $g_y(i,j)$ at a sample location (i,j) in the affine coded block in a prediction sample I(i,j);
        generate a prediction refinement $\Delta I(i,j)$ based on the spatial gradients $g_x(i,j)$ and $g_y(i,j)$; and
        add the prediction refinement $\Delta I(i,j)$ to the prediction sample I(i,j) to generate a refined prediction sample.

12. The apparatus of claim 11, wherein responsive to the picture level syntax element indicating the PROF for affine prediction is not disabled for the current picture, the PROF for affine prediction is applied to the affine coded block.

13. The apparatus of claim 11, wherein the PROF for affine prediction is enabled by default.

14. The apparatus of claim 11, wherein the circuitry is further configured to:
    determine whether to apply the PROF for affine prediction to the affine coded block based on values of affine parameters of an affine model of the affine coded block.

15. The apparatus of claim 11, wherein the circuitry is further configured to:
generate the spatial gradients $g_x(i,j)$ and $g_y(i,j)$ at the sample location (i,j) based on a first prediction sample(s) of a first sub-block including the prediction sample I(i,j) and a second prediction sample(s) of a second sub-block neighboring the first sub-block, the first sub-block and the second sub-block being partitioned from the affine coded block.

16. The apparatus of claim 11, wherein the circuitry is further configured to:
perform inter prediction for sub-blocks of the affine coded block; and
generate spatial gradients at sample locations on a basis of prediction samples of the entire affine coded block.

17. The apparatus of claim 11, wherein the circuitry is further configured to:
generate the spatial gradients $g_x(i,j)$ and $g_y(i,j)$ at the sample location (i,j) using a generated gradient filter on reference samples in a reference picture of the affine coded block.

18. The apparatus of claim 17, wherein the generated gradient filter is generated by a convolution of a first gradient filter and an interpolation filter,
wherein application of the interpolation filter on the reference samples in the reference picture of the affine coded block generates prediction samples of the affine coded block, and subsequent application of the first gradient filter on the generated prediction samples of the affine coded block generates the spatial gradients $g_x(i,j)$ and $g_y(i,j)$.

19. A non-transitory computer-readable medium storing instructions that, when executed by a processor, cause the processing to perform a method, the method comprising:
receiving a picture level syntax element indicating whether a prediction refinement with optical flow (PROF) for affine prediction is disabled for a current picture;
determining whether to apply the PROF for affine prediction to an affine coded block in the current picture based on the picture level syntax element indicating whether the PROF for affine prediction is disabled for the current picture,
wherein responsive to the picture level syntax element indicating the PROF for affine prediction is disabled for the current picture, the PROF for affine prediction is not applied to the affine coded block in the current picture; and
responsive to the PROF for affine prediction being determined as applied to the affine coded block:
generating spatial gradients g_x (i,j) and g_y (i,j) at a sample location (i,j) in the affine coded block in a prediction sample I(i,j);
generating a prediction refinement ΔI(i,j) based on the spatial gradients g_x (i,j) and g_y (i,j); and
adding the prediction refinement ΔI(i,j) to the prediction sample I(i,j) to generate a refined prediction sample.

* * * * *